US010990748B2

(12) United States Patent
Kang et al.

(10) Patent No.: US 10,990,748 B2
(45) Date of Patent: Apr. 27, 2021

(54) ELECTRONIC DEVICE AND OPERATION METHOD FOR PROVIDING COVER OF NOTE IN ELECTRONIC DEVICE

(71) Applicant: Samsung Electronics Co., Ltd., Gyeonggi-do (KR)

(72) Inventors: Minhee Kang, Seoul (KR); Kyung-Hwa Kim, Seoul (KR); Hyung Joo Jin, Seoul (KR)

(73) Assignee: Samsung Electronics Co., Ltd

( * ) Notice: Subject to any disclaimer, the term of this patent is extended or adjusted under 35 U.S.C. 154(b) by 53 days.

(21) Appl. No.: 16/306,814

(22) PCT Filed: Jun. 2, 2017

(86) PCT No.: PCT/KR2017/005805
§ 371 (c)(1),
(2) Date: Dec. 3, 2018

(87) PCT Pub. No.: WO2017/209568
PCT Pub. Date: Dec. 7, 2017

(65) Prior Publication Data
US 2019/0294652 A1 Sep. 26, 2019

(30) Foreign Application Priority Data

Jun. 3, 2016 (KR) .................. 10-2016-0069709

(51) Int. Cl.
*G06F 17/00* (2019.01)
*G06F 40/10* (2020.01)
(Continued)

(52) U.S. Cl.
CPC .......... *G06F 40/10* (2020.01); *G06F 3/04883* (2013.01); *G06F 16/00* (2019.01);
(Continued)

(58) Field of Classification Search
CPC .... G06F 3/0481; G06F 3/0483; G06F 3/0485; G06F 3/04883; G06F 3/14; G06F 16/00;
(Continued)

(56) References Cited

U.S. PATENT DOCUMENTS 9,268,858 B1 * 2/2016 Yacoub .............. G06F 16/9535
2010/0107091 A1 * 4/2010 Amsterdam .......... G06F 16/958
715/760

(Continued)

FOREIGN PATENT DOCUMENTS

JP          2011118481       6/2011
KR       1020110001105       1/2011

(Continued)

OTHER PUBLICATIONS

PCT/ISA/210 Search Report issued on PCT/KR2017/005805 (pp. 5).
PCT/ISA/237 Written Opinion issued on PCT/KR2017/005805 (pp. 6).

*Primary Examiner* — Jason T Edwards
(74) *Attorney, Agent, or Firm* — The Farrell Law Firm, P.C.

(57) ABSTRACT

Various embodiments of the present invention provide a method and an apparatus for providing, by an electronic device, a note cover on the basis of a note object created by a user. According to various embodiments of the present invention, an electronic device may comprise: a display; a memory; and a processor electrically connected to the display and the memory, wherein the processor is configured to extract a set page in response to generation of a note, recognize at least one object in the extracted page, generate visual information for a cover image on the basis of the object, display a preview cover on the basis of the visual information, and generate a cover image on the basis of the (Continued)

preview cover and file information related to the note. Various embodiments are possible.

17 Claims, 20 Drawing Sheets

(51) Int. Cl.
    *G06F 16/00*     (2019.01)
    *G06F 3/0488*     (2013.01)
    *G06K 9/00*     (2006.01)
    *G06F 40/20*     (2020.01)
    *G06F 40/166*     (2020.01)

(52) U.S. Cl.
    CPC ............ *G06F 40/166* (2020.01); *G06F 40/20* (2020.01); *G06K 9/00416* (2013.01)

(58) Field of Classification Search
    CPC ...... G06F 40/166; G06F 40/20; G06F 40/169; G06F 2203/04806; G06F 2203/04808; G06K 9/00416
    USPC .......................................... 715/256
    See application file for complete search history.

(56) References Cited

U.S. PATENT DOCUMENTS

| | | | |
|---|---|---|---|
| 2011/0055682 A1* | 3/2011 | Friedrich | G06F 40/177 |
| | | | 715/227 |
| 2011/0113366 A1 | 5/2011 | Cheong et al. | |
| 2011/0214090 A1* | 9/2011 | Yee | G06Q 10/10 |
| | | | 715/838 |
| 2011/0264653 A1* | 10/2011 | Cierniak | G06F 16/958 |
| | | | 707/723 |
| 2012/0192118 A1* | 7/2012 | Migos | G06F 3/0483 |
| | | | 715/863 |
| 2013/0212535 A1 | 8/2013 | Kim | |
| 2013/0222283 A1 | 8/2013 | Yun | |
| 2014/0372877 A1* | 12/2014 | Snyder | G06F 40/106 |
| | | | 715/254 |
| 2015/0149180 A1 | 5/2015 | Lee | |
| 2016/0124813 A1* | 5/2016 | Jain | G06F 40/169 |
| | | | 707/684 |
| 2017/0061416 A1* | 3/2017 | Morate | G06F 16/51 |

FOREIGN PATENT DOCUMENTS

| | | |
|---|---|---|
| KR | 1020110051374 | 5/2011 |
| KR | 1020130092934 | 8/2013 |
| KR | 1020150060392 | 6/2015 |
| KR | 1020150067117 | 6/2015 |

* cited by examiner

As well as reviving the internal space, this renovation has reconnected the gallery with its neighbours.

A new balcony overlooks a new garden, with space for outdoor sculpture, and easy access to the Yorkshire Museum, amid the leafy grounds and romantic ruins of York's medieval abbey.

ELECTRONIC DEVICE AND OPERATION METHOD FOR PROVIDING COVER OF NOTE IN ELECTRONIC DEVICE

PRIORITY

This application is a National Phase Entry of PCT International Application No. PCT/KR2017/005805, which was filed on Jun. 2, 2017, and claims priority to Korean Patent Application No. 10-2016-0069709, which was filed on Jun. 3, 2016, the content of each of which are incorporated herein by reference.

TECHNICAL FIELD

Various embodiments of the present disclosure relate to a method and an apparatus for providing a cover of a note created by a user in an electronic device.

BACKGROUND ART

With the recent enhancement of digital technology, various types of electronic devices such as mobile communication terminals, smart phones, tablet personal computers (PCs), notebooks, wearable device, or the like are widely used.

An electronic device provides various note functions (for example, a function of writing a memo) according to user's needs for creating a note using the electronic device. The electronic device may save and manage the note created by the user. The electronic device may use a note cover for the note to be saved, and provide the note. For example, the electronic device may store one or more pre-set covers, and may allow the user to select one of the pre-stored covers when saving a created note, or may randomly and automatically select any one of the covers.

DETAILED DESCRIPTION OF THE INVENTION

Technical Objects

However, there is a limit to providing related-art note covers, and a cover image that is not related to a created note may be displayed. Accordingly, the related-art note covers are not intuitive for users, and there is a limit to expressing covers. In addition, a problem that an undesired cover is provided to a user may arise. In addition, an electronic device supporting a function of creating a note cover should directly create a note cover every time a user creates a note, which may cause a user a difficulty in creating a note cover and inconvenience.

Various embodiments provide a method and an apparatus for automatically forming a note cover on the basis of a note object created by a user, and providing the note cover.

Various embodiments provide a method and an apparatus for generating and recommending a cover of a note file on the basis of a note object (for example, a text, a picture, an attached image, or the like) created by a user in an electronic device.

Various embodiments provide a method and an apparatus for automatically forming a note cover on the basis of a note object (for example, a text object, an image object) included in a specific page (for example, a last page, a recently modified page, or a page including a main object) of a note created by a user, and providing the note cover.

Technical Solving Means

An electronic device according to various embodiments of the present disclosure may include: a display; a memory; and a processor electrically connected with the display and the memory, wherein the processor is configured to: extract a set page in response to a note being generated; recognize at least one object in the extracted page; generate visual information for a cover image based on the object; display a preview cover based on the visual information; and generate a cover image based on the preview cover and file information associated with the note.

An operating method of an electronic device according to various embodiments of the present disclosure may include: extracting a set page in response to a note being generated; recognizing at least one object in the extracted page; generating visual information for a cover image based on the object; displaying a preview cover based on the visual information; and generating a cover image based on the preview cover and file information associated with the note.

Various embodiments of the present disclosure to achieve the above-described objects may include a computer readable recording medium having a program recorded thereon to cause a processor to perform the above-described method.

Advantageous Effect

According to the electronic device and the operating method thereof according to various embodiments, a note cover can be automatically formed based on a note object created by a user, and may be provided. For example, the electronic device generates and recommends a cover of a note file based on a note object (for example, a text, a picture, an attached image, or the like) created by a user, such that convenience can be provided to the user.

According to various embodiments, after a note object (or content) is determined, an image is automatically edited and a corresponding cover is recommended, such that a cover associated with each note can be provided. Accordingly, by providing a cover associated with a note created by a user, there is an effect of enhancing intuitiveness of the user in identifying a note. According to various embodiments, the electronic device provides a constant template (or layout), and can maintain a constant quality of a cover image regardless of a content of a note object. According to various embodiments, usability, convenience and competitiveness of the electronic device can be enhanced.

BRIEF DESCRIPTION OF THE DRAWINGS

FIGS. 7A to 7D and FIGS. 8 to 11 are views illustrating various operations of converting an object into visual information in the electronic device according to various embodiments of the present disclosure;

BEST MODE FOR EMBODYING THE INVENTION

Figure 1:
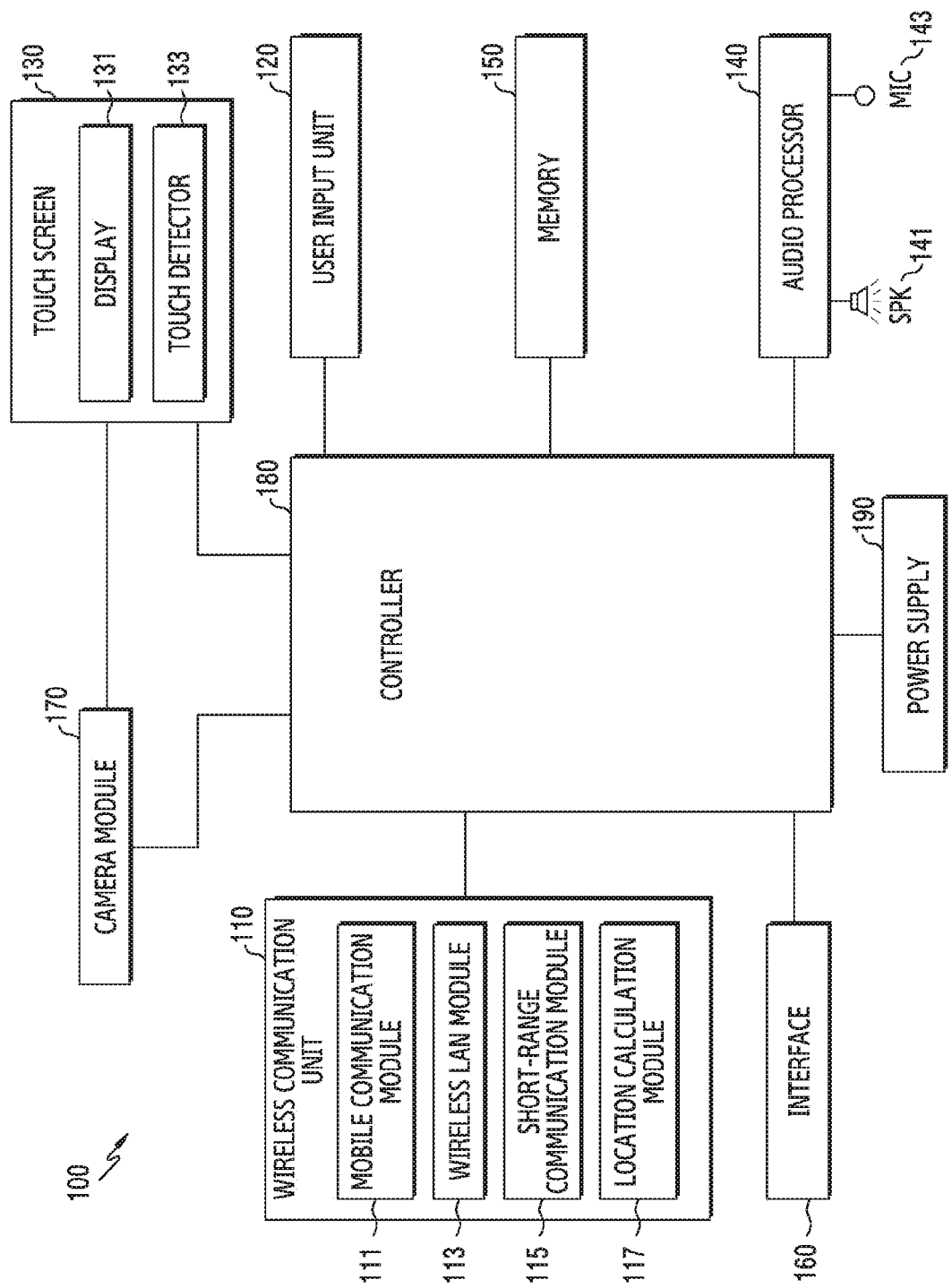
FIG. 1 is a view schematically illustrating a configuration of an electronic device according to various embodiments.

Various exemplary embodiments of the present disclosure will be described herein below with reference to the accompanying drawings. However, exemplary embodiments and terms used herein are not intended to limit the technical features described in the present disclosure to specific embodiments and should be understood as including modifications, equivalents and/or alternatives of exemplary embodiments of the present disclosure. In the explanation of the drawings, similar reference numerals are used for similar elements. In addition, exemplary embodiments of the present disclosure are suggested for explanation and understanding of the technical features disclosed herein and do not limit the scope of the present disclosure. Accordingly, the scope of the present disclosure should be interpreted as including all changes based on the technical idea of the present disclosure or various other embodiments.

Various exemplary embodiments of the present disclosure relate to an electronic device including various note functions and a method for operating thereof. For example, various exemplary embodiments of the present disclosure disclose a method and an apparatus for generating and recommending a cover of corresponding a note file based on a note object (for example, text, image, attached image, etc.) that is generated by a user.

According to various exemplary embodiments, an electronic device may include all kinds of devices including various note functions and using one or more of various processors, such as an application processor (AP), a communication processor (CP), a graphic processing unit (GPU), and a central processing unit (CPU), like all information and communication devices, multimedia devices, wearable devices, Internet of things (IoT) devices, and application devices therefor.

An electronic device according to various embodiments of the present disclosure may include at least one of, for example, smartphones, tablet personal computers (PCs), mobile phones, video telephones, electronic book readers, laptop PCs, netbook computers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to certain embodiments of the present disclosure, the electronic devices may include at least one of, for example, televisions (TVs), digital versatile disc (DVD) players, audios, refrigerators, air conditioners, cleaners, ovens, microwave ovens, washing machines, air cleaners, set-top boxes, home automation control panels, media boxes (e.g., Samsung HomeSync™, Apple TV™, or Google TV™), game consoles (e.g., Xbox™ and PlayStation™), electronic dictionaries, electronic keys, camcorders, or electronic picture frames.

According to another embodiment, the electronic devices may include at least one of medical devices (e.g., various portable medical measurement devices (e.g., a blood glucose monitoring device, a heartbeat measuring device, a blood pressure measuring device, a body temperature measuring device, and the like)), navigation devices, global navigation satellite systems (GNSS), vehicle infotainment devices, electronic equipment for vessels (e.g., navigation systems and gyrocompasses), head units for vehicles, industrial or home robots, drones, points of sales (POSs), or internet of things (e.g., light bulbs, various sensors, sprinkler devices, fire alarms, thermostats, toasters, exercise equipment, heaters, boilers, and the like). According to a certain embodiment, the electronic devices may include at least one of furniture, buildings/structures or a part of a car, electronic boards, electronic signature receiving devices, projectors, or various measuring instruments (e.g., water meters, electricity meters, gas meters, or wave meters, and the like). The electronic devices according to various embodiments may be flexible or a combination of two or more of the above-mentioned devices. Electronic devices according to various embodiments of the present disclosure are not limited to the above-mentioned devices.

The term "user" used in the various exemplary embodiments may refer to a person who uses the electronic device or a device that uses the electronic device (for example, an artificial intelligence electronic device).

At least a portion of an apparatus (for example, modules or functions thereof) or a method (for example, operations) according to various embodiments may be implemented by instructions stored in a computer-readable recording media (for example, a memory) in the form of a programmable module. When the instruction is executed by a processor, the processor may perform a function corresponding to the instruction.

The computer-readable recording media may include a hard disk, a floppy disk, a magnetic media (for example, a magnetic tape), an optical recording media (for example, compact disc read only memory (CD-ROM), a digital versatile disc (DVD), a magneto-optical media (for example, a floptical disk)), and an internal memory. Also, the instruction may include a code generated by a compiler or a code executable by an interpreter. A module or a programming module according to various embodiments may include at least one of the above elements, or a portion of the above elements may be omitted, or additional other elements may be further included. Operations performed by a module, a programming module, or other elements according to various embodiments may be executed sequentially, in parallel, repeatedly, or in a heuristic method. Also, a portion of operations may be executed in different sequences, omitted, or other operations may be added.

Hereinafter, an operating method and an apparatus according to various exemplary embodiments of the present disclosure will be described with reference to the accompanying drawings. However, since various exemplary embodiments of the present disclosure are not restricted or limited by the following description, it should be noted that the present disclosure can be applied to various exemplary embodiments based on the following embodiments. In various exemplary embodiments described below, a hardware approach method will be described by way of an example. However, since various exemplary embodiments of the present disclosure include technology which use both hardware and software, various exemplary embodiments of the present disclosure do not exclude an approach method based on software.

FIG. 1 is a view schematically illustrating a configuration of an electronic device according to various embodiments.

Referring to FIG. 1, the electronic device 100 according to various embodiments may include, for example, a wireless communication unit 110, a user input unit 120, a touch screen 130, an audio processor 140, a memory 150, an interface 160, a camera module 170, a controller 180 (for example, a processor including a processing circuitry), and a power supply 190. The electronic device 100 according to various embodiments of the present disclosure may be implemented to include more or fewer elements than those illustrated in FIG. 1 since the elements illustrated in FIG. 1 are not essential. For example, the electronic device 100 according to various embodiments may not include some elements such as the wireless communication unit 110 or the camera module 170 according to a type of the electronic device 100.

The wireless communication unit 110 may include one or more modules enabling wireless communication between the electronic device 100 and other electronic devices. For example, the wireless communication unit 110 may be configured to include a mobile communication module 111, a wireless local area network (WLAN) module 113, a short-range communication module 115, and a location calculation module 117. In various embodiments, the wireless communication unit 110 may include a module (for example, a short-range communication module, a long-range communication module, or the like) for communicating with surrounding external electronic devices. According to various embodiments, the wireless communication unit 110 may transmit a note created by a user to another electronic device, or may receive a note from another electronic device. The wireless communication unit 110 may receive note cover data from an associated server.

The mobile communication module 111 may include, for example, a cellular module. The mobile communication module 111 may transmit and receive wireless signals to and from at least one of a base station, an external electronic device, or various servers (for example, an application server, a management server, an integration server, a provider server, a content server, an Internet server, or a cloud server) over a mobile communication network. The wireless signal may include a voice signal, a data signal, or various control signals. The mobile communication unit 111 may transmit various data necessary for operations of the electronic device 100 to an external electronic device in response to a user request.

The wireless LAN module 113 may indicate a module for accessing a wireless Internet and forming a wireless LAN link with other electronic devices. The wireless LAN module 113 may be embedded in the electronic device 100 or may be provided outside the electronic device 100. As wireless Internet technology, wireless fidelity (WiFi), wireless gigabit alliance (WiGig), wireless broadband (Wibro), world interoperability for microwave access (WiMax), high speed downlink packet access (HSPDA), or mmWave (millimeter wave) may be used. The wireless LAN module 113 may interwork with other electronic devices connected with the electronic device 100 through a network (for example, a wireless Internet network), and may transmit various data of the electronic device 100 to external electronic devices or may receive data from external electronic devices. The wireless LAN module 113 may be always maintained in an on-state or may be turned on or turned off according to setting of the electronic device 100 or a user input.

The short-range communication module 115 may indicate a module for performing short range communication. As short-range communication technology, Bluetooth, Bluetooth low energy (BLE), radio frequency identification (RFID), infrared data association (IrDA), ultra wideband (UWB), zigBee, near field communication (NFC), or the like may be used. The short-range communication module 115 may interwork with other electronic devices connected with the electronic device 100 through a network (for example, a short-range communication network), and may transmit various data of the electronic device 100 to external electronic devices, or may receive data from external electronic devices. The short-range communication module 115 may be always maintained in an on-state, or may be turned on or turned off according to setting of the electronic device 100 or a user input.

The location calculation module 117 is a module for obtaining a location of the electronic device 100, and may include a GPS module as a representative example. The location calculation module 117 may measure the location of the electronic device 100 based on the principle of triangulation. Location information of the electronic device 100 may be obtained by various methods.

The user input unit 120 may generate input data for controlling an operation of the electronic device 100 in response to a user input. The user input unit 120 may include at least one input device for detecting user's various inputs. For example, the user input unit 120 may include a key pad, a dome switch, a physical button, a touch pad (resistive/capacitive), a jog & shuttle, a sensor, and the like. According to an embodiment, the user input unit 120 may include an electronic pen. According to an embodiment, the user input unit 120 may be implemented to receive an input of a force touch.

According to various embodiments, the sensor may measure a physical quantity or detect an operation state of the electronic device 100, and may convert measured or detected information into an electric signal. The sensor may include, for example, an iris scan sensor, a fingerprint scan sensor, an image sensor, an illuminance sensor, or the like. In addition, the sensor may include at least one of a gesture sensor, a gyro sensor, a pressure sensor, a magnetic sensor, an acceleration sensor, a terrestrial sensor, a motion recognition sensor, a grip sensor, a proximity sensor, a color sensor (for example, red, green, blue (RGB) sensor), a medical sensor, a temperature-humidity sensor, a ultra violet (UV) sensor, or a heart rate monitor (HRM) sensor. In addition, the sensor may include, for example, an E-nose sensor, an electromyography (EMG) sensor, an electroencephalogram (EEG) sensor, an electrocardiogram (ECG) sensor, an infrared (IR) sensor, or the like.

A part of the user input unit 120 may be implemented in the form of an external button of the electronic device 100, and a part or entirety of the user input unit 120 may be implemented as a touch panel. The user input unit 120 may receive a user input to initiate an operation of the electronic device 100 (for example, a power on/off function, an audio play function, a note function, or the like), and may generate an input signal according to a user input.

The touch screen 130 indicates an input/output device which performs an input function and a display (output) function, simultaneously, and may include a display 131 and a touch detector 133. The touch screen 130 may provide an input/output interface for an interaction between the electronic device 100 and the user. The touch screen 130 may include a mediator role for transmitting a user's touch input to the electronic device 100, and for showing an output from the electronic device 100 to the user. The touch screen 130 may show a visual output to the user. The visual output may be displayed in the form of a text, a graphic, or a video, or a combination thereof.

The display 131 may display (output) a variety of information processed in the electronic device 100. The display 131 may display various user interfaces (UIs) or graphic UIs (GUIs) related to the use of the electronic device 100. Various displays may be used for the display 131. For example, the display 131 may include a liquid crystal display (LCD), a light emitting diode (LED) display, an organic LED (OLED) display, a microelectromechanical system (MEMS) display, an electronic paper display, or the like. Some displays may be implemented by a transparent display including a transparent type of display or a photo-transparent type of display. In various embodiments, a bended display may be used for the display 131.

The touch detector 133 may be mounted in the display 131, and may detect a user input contacting or approaching a surface of the touch screen 130. The user input may include a touch input or a proximity input inputted based on at least one of a single touch, a multi-touch, hovering, or an air gesture. The touch detector 133 may receive a user input for initiating an operation related to use of the electronic device 100 according to various embodiments, and may generate an input signal according to a user input. The touch detector 133 may be configured to convert a change in pressure applied to a specific portion of the display 131, or in capacitance generated at a specific portion of the display 131 into an electric input signal. The touch detector 133 may detect a location and an area of a portion on the surface of the display 131 that an input tool (for example, a user finger, an electronic pen) touches or approaches. In addition, the touch detector 133 may be implemented to detect a pressure (for example, a force touch) when the user touches according to an applied touch method.

The audio processor 140 may transmit an audio signal received from the controller 180 to a speaker (SPK) 141, and may transmit an audio signal received from a microphone (MIC) 143, such as a voice, to the controller 180. The audio processor 140 may convert voice/sound data into an audible sound under control the controller 180, and output the sound through the speaker 141, and may convert an audio signal received from the microphone 143, such as a voice, into a digital signal, and may transmit the digital signal to the controller 180.

The speaker 141 may output audio data which is received from the wireless communication unit 110, or is stored in the memory 150. The speaker 141 may output sound signals related to various operations (functions) performed in the electronic device 100.

The microphone 143 may receive an external sound signal and may process the sound signal into electric voice data. The microphone 143 may have various noise reduction algorithms implemented to remove a noise generated in the process of receiving the external sound signal. The microphone 143 may serve to input audio streaming such as a voice command.

The memory 150 may store one or more programs executable by the controller 180, and may temporarily store inputted/outputted data. The inputted/outputted data may include, for example, a file such as a note, a note cover, a video, an image, a photo, or an audio. The memory 150 may serve to store obtained data. The memory 150 may store data obtained in real time in a temporary storage device, and may store data confirmed to be stored in a storage device which stores data for long time.

In various embodiments, the memory 150 may store one or more programs, data, or instructions related to causing the controller 180 (for example, a processor) to generate and recommend a cover of a note file, based on a note object (for example, a text, a picture, an attached image, or the like) created by a user. According to various embodiments, the memory 150 may store one or more programs, data, or instructions related to extracting a set page in response to a note being generated, recognizing an object from the extracted page, generating visual information for a cover image based on the object, displaying a preview cover based on the visual information, and generating a cover image based on the preview cover and file information associated with the note.

The memory 150 may include one or more application modules (or software modules). According to various embodiments, the memory 150 may store one or more note files created by the user. In various embodiments, the note file may be provided in the form of an image by a note cover based on a note object created by the user. A corresponding note may be provided on the display 131 in response to a note file in the form of an image being selected.

The interface 160 may receive data from other electronic devices, or receive power, and may transmit data or power to the respective elements of the electronic device 100. The interface 160 may allow data inside the electronic device 100 to be transmitted to other electronic devices. For example, the interface 160 may include a wired/wireless headphone port, an external charger port, a wired/wireless data port, a memory card port, an audio input/output port, a video input/output port, or an earphone port.

The camera module 170 indicates an element supporting a photographing function of the electronic device 100. The camera module 170 may photograph a certain subject under control of the controller 180, and may transmit photographed data (for example, an image) to the display 131 and the controller 180.

The controller 180 (for example, a processor) may control an overall operation of the electronic device 100. In various embodiments, the controller 180 may include one or more processors, or the controller 180 may be referred to as a processor. For example, the controller 180 may include a communication processor (CP), an application processor (AP), an interface (for example, a general purpose input/output (GPIO)), or an internal memory as a separate element, or may be integrated into one or more integrated circuits. According to an embodiment, the AP may execute various software programs and perform various functions for the electronic device 100, and the CP may perform processing and controlling for voice communication and data communication. In addition, the controller 180 may execute a specific software module (for example, an instruction set) stored in the memory 150, and may perform specific various functions corresponding to the module.

In various embodiments, the controller 180 may control an operation of a hardware module such as the audio processor 140, the interface 150, the display 131, or the camera module 170. According to various embodiments, the controller 180 may be electrically connected with the display 131 and the memory 150 of the electronic device 100.

According to various embodiments, the controller 180 may control an operation of generating and recommending a cover of a corresponding note file, based on a note object (for example, a text, a picture, an attached image, or the like) created by a user. According to various embodiments, the controller 180 may control an operation of extracting a set page in response to a note being generated, an operation of recognizing an object from the extracted page, an operation of generating visual information for a cover image based on the object, an operation of displaying a preview cover based on the visual information, and an operation of generating a cover image based on the preview cover and file information associated with the note. According to various embodiments, the controller 180 may process operations related to extracting a set page from pages of a note created by a user, and generating and recommending a cover associated with the note, based on at least one object of the extracted page. According to various embodiments, the set page may include a last page of the pages of the note created by the user, a recently modified page of the pages of the note created by the user, or a page including a main object from among the pages of the note created by the user. According to various embodiments, the main object may be defined by the electronic device 100 or the user. For example, the main object may indicate an object of a specific form expressing or distinguishing a feature of the note, such as a handwriting-based figure, a specific content type (for example, an image, a video, music, or the like), a link (for example, URL). An importance of the main object may be set or changed variously by the user.

The control operation of the controller 180 according to various embodiments will be described in detail with reference to the drawings, which will be described below.

The power supply 190 may receive external power or internal power under control of the controller 180, and may supply power necessary for operations of the respective elements. In various embodiments, the power supply 190 may supply or shut off (on/off) power to the wireless communication unit 110, the display 131, and the camera module 170, or the like under control of the controller 180.

According to various embodiments, the power supply 190 may include, for example, a battery control circuit. For example, the power supply 190 may be configured to include a battery (for example, a rechargeable battery and/or a solar battery), a battery remaining capacity measurement circuit (for example, a fuel gauge), a power management integrated circuit (PMIC), a charging circuit, a booster circuit, or the like. As described above, the electronic device 100 may include the display 131, the memory 150, and a processor (for example, the controller 180) electrically connected with the display 131 and the memory 150. The processor may be configured: extract a set page in response to a note being generated; recognize at least one object in the extracted page; generate visual information for a cover image based on the object; display a preview cover based on the visual information; and generate a cover image based on the preview cover and file information associated with the note.

According to various embodiments, the processor may be configured to extract a last page of the note, a recently modified page of pages of the note, or a page including a main object.

According to various embodiments, the processor is configured to determine an image object in response to the object being recognized, to generate the visual information based on a text object when the image object does not exist in the page, and to generate the visual information based on the image object when the image object exists in the page.

According to various embodiments, the processor may be configured to extract a characteristic point in the text object, and to generate the visual information based on an object corresponding to the characteristic point. According to various embodiments, the processor may be configured to extract, from the text object, the characteristic point based on at least part of a font color different from those of surrounding objects, a font style, a highlighted portion, and a picture drawn by handwriting. According to various embodiments, when a plurality of characteristic points are extracted from the text object, the processor may be configured to determine a characteristic point according to a set priority, or to determine a characteristic point by including all of the characteristic points in a single range.

According to various embodiments, the processor may be configured to determine an image area of the image object with reference to an entire screen, when the image area is less than a reference ratio, to generate the visual information based on at least part of a region including an object in the page, and, when the image area is greater than or equal to the reference ratio, to generate the visual information based on at least part of the image object.

According to various embodiments, wherein the processor may be configured to generate one or more pieces of visual information corresponding to a pre-defined template, by using the object.

According to various embodiments, the processor may be configured to generate the cover image by combining a preview cover selected from the preview covers and file information related to the note, and the file information may include a file name and time information.

According to various embodiments, the processor may be configured to provide a recommendation marker on a specific preview cover recommended by the electronic device among the preview covers.

Hereinafter, an operation of providing a note function in the electronic device 100 according to various embodiments of the present disclosure will be described.

According to various embodiments of the present disclosure, the electronic device 100 may determine a note object (a text, a content (an image, a video, music, or the like)) created by a user, and provide a cover suitable for the note object by recommending the cover according to the determined note object.

According to various embodiments, when storing a note created by the user, the electronic device 100 may extract a specific set page, such as a last page of the created note, a recently modified page, or a page including a main feature. The electronic device 100 may determine an area of an image included in the corresponding page, and, when the area of the image is greater than or equal to a reference ratio (for example, N %) of an entire screen, may recommend the corresponding image as a cover image. The electronic device 100 may determine the area of the image included in the corresponding page, and, when the area of the image is less than the reference ratio (for example, N %) of the entire screen, may change a specific portion of a region (for example, a handwritten region) directly created by the user to an image, and may recommend the image as a cover image.

According to various embodiments of the present disclosure, the electronic device 100 may determine a note object (or a content) and then automatically edit and recommend a corresponding cover, thereby providing a cover associated with each note. According to various embodiments, the electronic device 100 may provide a constant template (or a layout) and may maintain a constant quality of a cover image regardless of a content of a note object.

Figure 2:
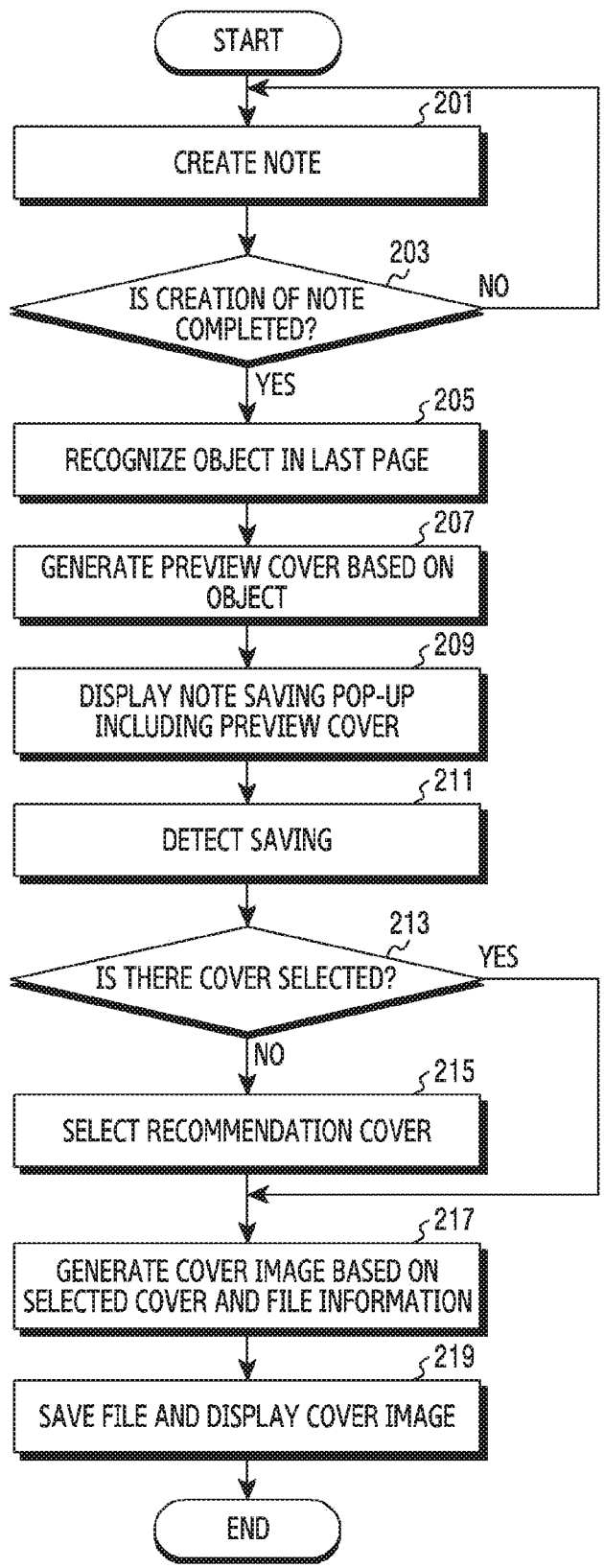
FIG. 2 is a flowchart illustrating a method for providing a note function in an electronic device according to various embodiments of the present disclosure.

FIG. 2 is a flowchart illustrating a method for providing a note function in the electronic device according to various embodiments of the present disclosure.

Referring to FIG. 2, in operation 201, the controller 180 (for example, a processor) of the electronic device 100 may create a note. For example, the controller 180 may execute a note function in response to a user input (for example, an operation input for executing a note function (or application)), and may display an interface related to note creation (hereinafter, a note creation interface) through the display 131. A user may create a note by inputting a text (for example, entering characters using a keypad, writing by handwriting, drawing a picture by handwriting, etc.), and inserting (attaching) an image (for example, a photo, a map, etc.) through the note creation interface. The controller 180 may create a note in response to a user input related to note creation. According to various embodiments, the user may create a note including a plurality of pages while turning over pages. This will be described below with reference to FIG. 3.

In operation 203, the controller 180 may determine whether the creation of the note is completed. According to an embodiment, the user may create the note, and may generate a user input (for example, selecting a save button on the note creation interface) to save the created note. In response to the user input, the controller 180 may determine whether the creation of the note is completed.

When it is not detected that the creation of the note is completed in operation 203 (No in operation 203), the controller 180 may resume operation 201 and process operations after operation 201.

When it is detected that the creation of the note is completed in operation 302 (Yes in operation 203), the controller 180 may recognize an object from a last page in operation 205. For example, the controller 180 may analyze the page of the note created by the user, and may determine whether the page is a single page or a plurality of pages. According to an embodiment, when the note is created by a plurality of pages, the controller 180 may recognize at least one object based on the last page of the plurality of pages of the note. According to another embodiment, when the note is created by the plurality of pages, the controller 180 may recognize at least one object, based on a page recently modified by the user among the plurality of pages. According to another embodiment, when the note is created by the plurality of pages, the controller 180 may recognize at least one object based on a page containing a main object among the plurality of pages. In various embodiments, the controller 180 may extract (or parse) the plurality of pages created by the user, and may generate a cover based on at least one object of the corresponding page. According to various embodiments, the object is a note object that is created by the user, and may include, for example, a text (for example, written characters, a picture, a figure, or the like), and a content (for example, an image (a photo, an icon), a video, music, or the like). In the following description, a text-based object and an image-based object will be described as a representative example of a note object. However, the present disclosure is not limited thereto. The note object may include a content such as a video or music as described above.

In operation 207, the controller 180 may generate a preview cover based on the recognized object. According to an embodiment, when the note object is a text, the controller 180 may generate a preview cover based on a part or entirety of the text. According to an embodiment, when the note object is an image, the controller 180 may generate a preview cover based on a part or entirety of the image. According to an embodiment, the controller 180 may generate a preview cover based on a combination of a text and an image. According to an embodiment, the controller 180 may generate a preview cover based on the last page itself (for example, the whole page). According to various embodiments, the controller 180 may generate a plurality of preview covers of different forms according to a set cover template (or a layout) when generating the preview cover. According to various embodiments, the controller 180 may process a part or entirety of the note object through image processing to be applicable to a corresponding template, when generating the preview cover. According to various embodiments, the operation of generating the preview cover or the cover according various embodiments will be described in detail with reference to the drawings which will be described below.

In operation 209, the controller 180 may display a note saving pop-up including the preview cover. For example, the controller 180 may display an interface related to saving of the created note on a pop-up window (or a mini window), after generating the preview cover. The controller 180 may align and display the generated preview cover in a certain region of the pop-up when displaying the pop-up. This will be described below with reference to FIG. 4, which will be described below.

In operation 211, the controller 180 may detect saving. For example, the user may input or select file information (for example, a file name, a category, or the like), and select a preview cover, and then may select a confirmation button (for example, a done button, a save button, an OK button, etc.) provided to command saving on the note saving pop-up. The controller 180 may determine to save the created note when detecting an input by the confirmation button through the pop-up. According to various embodiments, the user may not select a preview cover and may directly select the confirmation button.

In operation 213, the controller 180 may determine whether there is a cover selected by the user. For example, the controller 180 may determine whether there is a cover selected from the preview covers provided through the pop-up.

When it is determined that there is a cover selected in operation 213 (Yes in operation 213), the controller 180 may proceed to operation 217 and may process operations after operation 217.

When it is determined that there is no cover selected in operation 213 (No in operation 213), the controller 180 may select a recommendation cover in operation 215. According to various embodiments, the controller 180 may recommend a preview cover of a specific template (layout) when providing the preview covers through the pop-up. The template of the recommended preview cover may be set by the user or may be pre-set by the electronic device, or may be randomly provided. Alternatively, a priority may be given to a template that is frequently used (or selected) by the user, and a preview cover may be recommended according to priority. According to various embodiments, the controller 180 may provide the recommendation preview cover to be distinguished from the other preview covers when providing the preview covers through the pop-up. This will be described below with reference to the drawings which will be described below.

In operation 217, the controller 180 may generate a cover image based the selected cover and file information. For example, the controller 180 may generate a cover image by combining the preview file with file information (for example, a file name inputted by the user to save, a note generation date, or the like). This will be described in detail below with reference to the drawings which will be described below.

In operation 219, the controller 180 may save the note file and may display the cover image. For example, the controller 180 may save the note file created by the user, and may display a cover of the stored note file based on the generated cover image. The cover image may be provided through a list of notes created and saved by the user. This will be described below with reference to FIG. 5.

Figure 3:
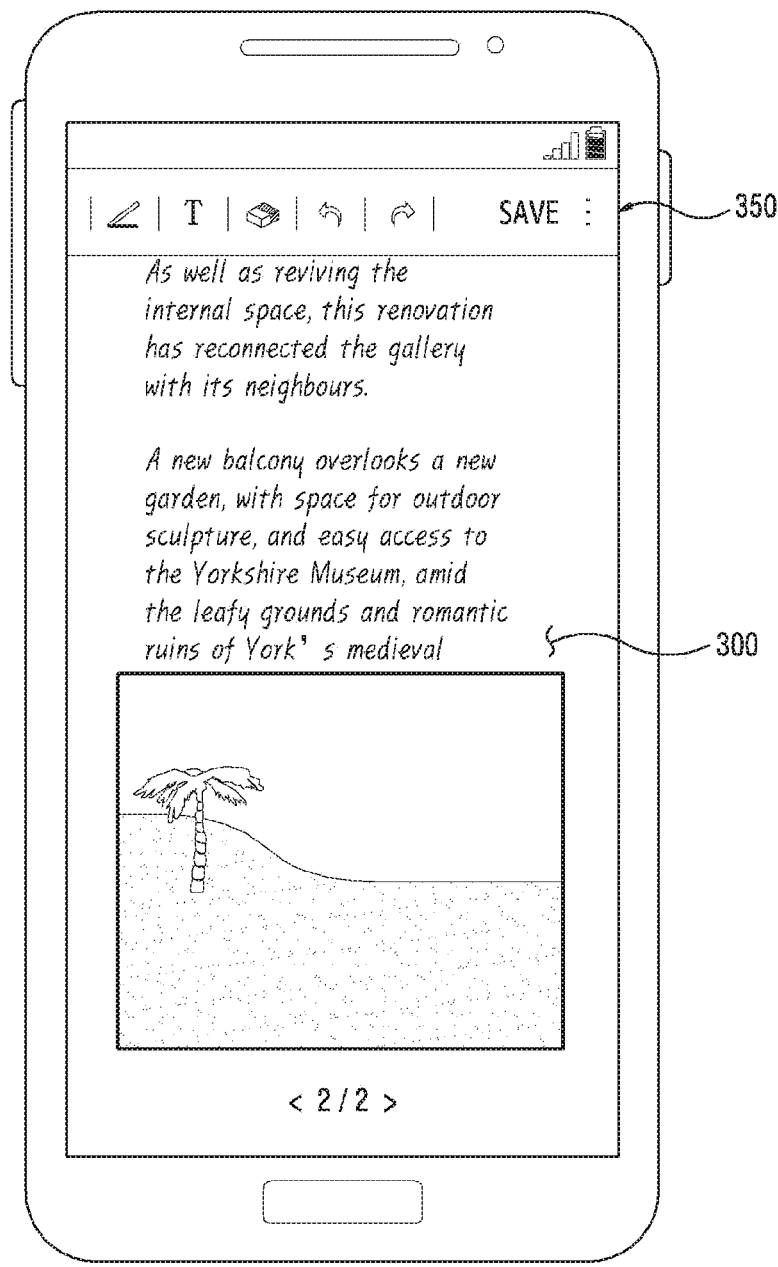
FIGS. 3, 4, and 5 are views illustrating an example of a screen providing a note function in the electronic device according to various embodiments of the present disclosure.

FIG. 3 is a view illustrating an example of a screen providing a note function in the electronic device according to various embodiments of the present disclosure.

Referring to FIG. 3, FIG. 3 illustrates an example of a screen on which a note function is executed in the electronic device 100 and a note object 300 corresponding to user's creating a note is displayed through the display 131. That is, FIG. 3 illustrates a state in which a note is created by the electronic device 100.

The electronic device 100 may execute the note function in response to a user input (for example, an operation input for executing the note function (or application)), and may display a note creation-related interface (hereinafter, a note creation interface) through the display 131 as shown in FIG. 3. According to an embodiment, the note creation interface may include a tool region 350. The tool region 350 may include various option menus related to creation of a note, such as a pen selection menu, an erase menu, a text mode menu, an input cancellation menu (undo), an input repeating menu (redo), a saving menu, or the like.

The user may create a note by inputting a text (for example, entering characters using a keypad, writing by handwriting, drawing a picture (figure) by handwriting), and inserting (attaching) an image (for example, a photo, a map, etc.), through the note creation interface. The controller 180 may create the note in response to a user input related to the note creation.

As shown in FIG. 3, the user may create a note by inputting a text (for example, entering characters using a keypad, writing by handwriting, drawing a picture (figure) by handwriting), and inserting (attaching) an image (for example, a photo, a map, or the like), and the electronic device 100 may display the note object 300 corresponding to user's creating the note. The user may create the note including a plurality of pages while turning over the pages. FIG. 3 illustrates a state in which the user is creating a note on the second page (for example, 2/2).

Figure 4:
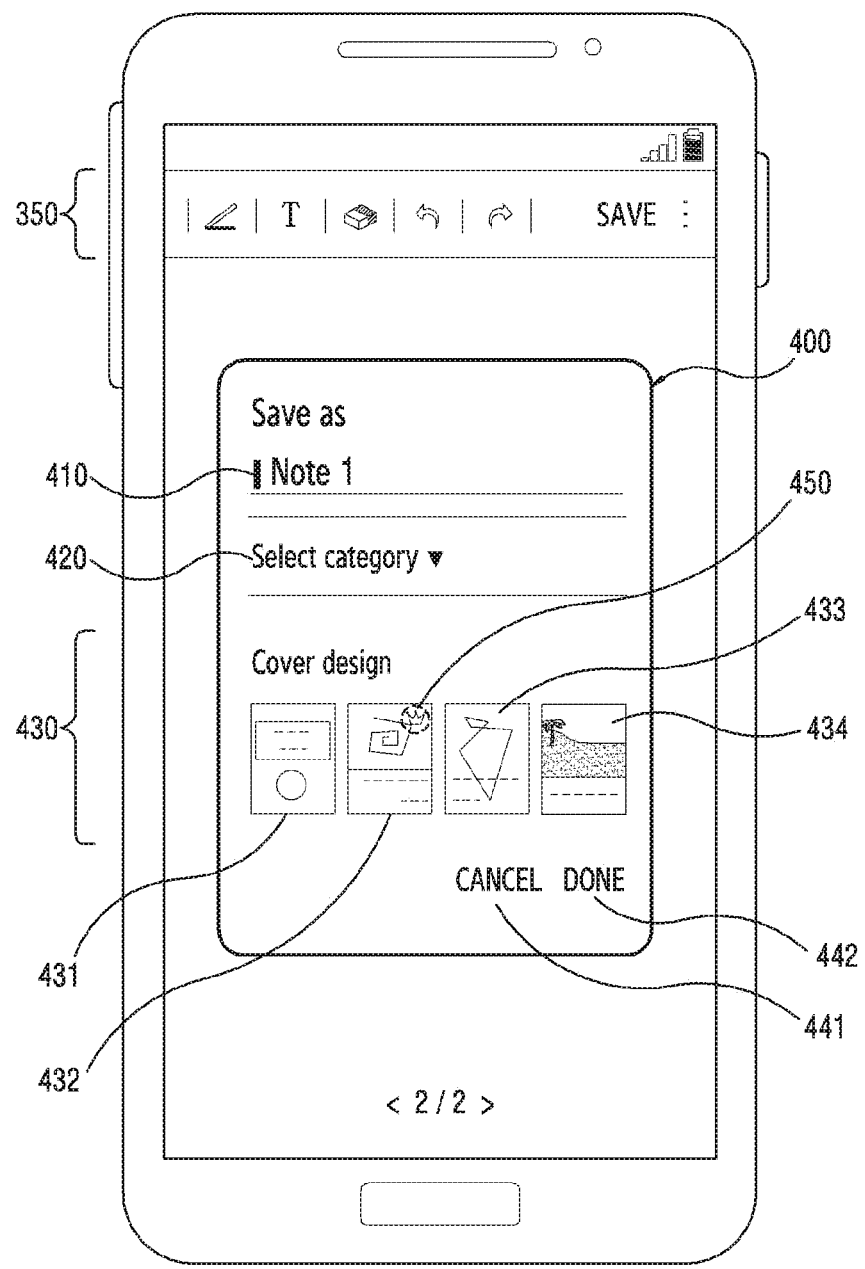

FIG. 4 is a view illustrating an example of a screen providing a note function in the electronic device according to various embodiments of the present disclosure.

Referring to FIG. 4, FIG. 4 illustrate an example of a screen of an operation of saving a note created by a user as shown in FIG. 3. For example, when the user wishes to completes the note created through the operation shown in FIG. 3, and to save the note, the user may complete and save the note by using a save menu (button) of the tool region 350. When it is detected that the creation of the note is completed by the user (for example, when a request for saving the note through the save menu is detected), the electronic device 100 may display a note saving pop up 400 including preview covers 431, 432, 432, 434.

According to various embodiments, the electronic device 100 may generate a plurality of preview covers corresponding to a plurality of templates and set based on the last page of the note created by the user as shown in FIG. 3. In various embodiments, the electronic device 100 may generate preview covers based on a part or entirety of a note object in the last page, or may generate preview covers based on a certain region or a whole region of the last page. According to an embodiment, when the note object is a text, the electronic device 100 may generate a preview cover based on a part or an entirety of the text. According to an embodiment, when the note object is an image, the electronic device 100 may generate a preview cover based on a part or an entirety of the image. According to an embodiment, when the note object is a video, the electronic device 100 may generate a preview cover based on at least one captured portion of the video. According to an embodiment, when the note object is music, the electronic device 100 may generate a preview cover based at least in part on an album cover of the music.

According to various embodiments, the electronic device 100 may generate a plurality of preview covers of different forms according to set cover templates when generating the preview covers. According to an embodiment, the electronic device 100 may process a part or entirety of the note object through image processing to be applicable to a corresponding template, when generating the preview covers.

According to various embodiments, a set number of templates may be implemented, and the preview cover may provide the corresponding object and the file information in a different position, in a different shape, or with a different effect, according to a type of a corresponding template (for example, a first type, a second type, a third type, a fourth type).

According to an embodiment, as illustrated by the preview cover 431, the preview cover of the first type may display a part or entirety of a corresponding object (for example, a text object, an image object) within a specific figure (for example, a circle, an oval, a star, a rectangle, a triangle), and may apply an opacity value to the other background region in a predetermined color and may add file information to the background region.

According to an embodiment, as illustrated by the preview cover 432, the preview cover of the second type may display an image of a part or an entirety of a corresponding object (for example, a text object, an image object) after alignment (for example, text paragraph alignment, a paragraph shape, indentation or the like), and may apply an opacity value to the whole page in a specific color, and may add file information to a lower end.

According to an embodiment, as illustrated by the preview cover 433, the preview cover of the third type may display an image of a part or entirety of a corresponding object (for example, a text object, an image object) (for example, a background image), and may add file information to a certain region of the image.

According to an embodiment, as illustrated by the preview cover 434, the preview cover of the fourth type may display an image of a part or entirety of a corresponding object (for example, a text object, an image object) which is imaged to have a size corresponding to a first setting region (for example, an image region) of a template (for example, a background image), and may add file information to a second setting region (for example, a file region) of the template. For example, the fourth type may be divided into two regions, the first setting region and the second setting region, and may separately display an image corresponding to the object and an image corresponding to the file information.

According to various embodiments, when providing the preview covers, the electronic device 100 may provide a preview cover recommended by the electronic device 100 to the user. For example, the electronic device 100 may recommend a preview cover determined by the electronic device 100 among the preview covers. According to an embodiment, when the electronic device 400 recommends the preview cover 432, the electronic device 400 may display a recommendation marker 450 (for example, a crown icon) on a certain region of the preview cover 432 as shown in FIG. 4, and may provide the preview cover 432 to the user.

According to various embodiments, when providing the preview covers, the electronic device 100 may provide information regarding a content included in the note. For example, when a content such as an image, a video, or music is inserted into the note, the electronic device 100 may display an associated item (for example, an icon form) indicating that the corresponding content is included, and may display the item to the user. According to an embodiment, when a video is included in the note, the electronic device 10 may display an associated item (for example, an icon form associated with a video (for example, a film icon)) for identifying the video on a certain region of the preview cover. According to an embodiment, when music is included in the note, the electronic device 100 may display an associated item (for example, an icon form associated with music (for example, a musical note icon)) for identifying music on a certain region of the preview cover.

The preview covers or the cover generation operation according to various embodiments will be described in detail with reference to the accompanying drawings, which will be described.

When more preview covers than in the example of FIG. 4 are included according to various embodiments, the preview covers may be provided by scrolling to the left or right based on a user input (for example, sweeping dragging, flicking, etc.) on a cover region 430.

According to various embodiments, after generating the preview covers, the electronic device 100 may display the interface related to saving of the created note through the pop-up 400. For example, as shown in FIG. 4, the electronic device 100 may provide the generated preview covers 431, 432, 433, 434 through a certain region of the pop-up 400 (for example, the cover region 430 of the lower end of the pop-up 400). According to various embodiments, the pop-up 400 may include an information input region (for example, a name entering field 410, a category selection field 420) for inputting or selecting file information (for example, a file name, a category) of the target note to be saved. According to an embodiment, the user may selectively enter a file name into the name entering field 410, or may use an automatically entered (generated) name (for example, Note 1). According to an embodiment, the user may set a category of the created note through the category selection field 420. An operation of setting the category may not be performed and may be omitted.

After or before selectively entering the file information, the user may select a preview cover for a cover of the note file to be generated among the preview covers 431, 432, 433, 434. According to various embodiments, the plurality of preview covers 431, 432, 433, 434 may be generated according to the respective templates set based on the note object of the last page of the note created by the user, and may be provided. This will be described in detail with reference to the drawings, which will be described below.

The user may save the created note or cancel saving after selecting the file information and the preview cover. For example, the user may cancel saving by selecting (for example, touching) a cancel button 441 (for example, CANCEL or NO) provided through a certain region of the pop-up 400, or may save by selecting a confirmation button 442 (for example, DONE, SAVE, or OK).

When the selection of the confirmation button 442 by the user through the pop-up 400 is detected, the electronic device 100 may determine that there is a command to generate (save) the note. When generating the note, the electronic device 100 may add time information to the file information (for example, a file name, a category). For example, the electronic device 100 may add, to the file information including name information and category information (for example, the category information may not be included) set by the user, time information (for example, a date, time) of a point of time when the corresponding note is saved (generated). When generating the note, the electronic device 100 may generate a cover image based on the preview cover selected by the user and the file information (for example, a file name, a category, time information). According to an embodiment, the electronic device 100 may generate the cover image by further adding the file information to a certain region of the preview cover selected by the user, and may generate a note file in association with the cover image and may save the note file in the memory 150. Cover images generated according to various embodiments, and examples thereof will be described below with reference to the drawings, which will be described below.

Figure 5:
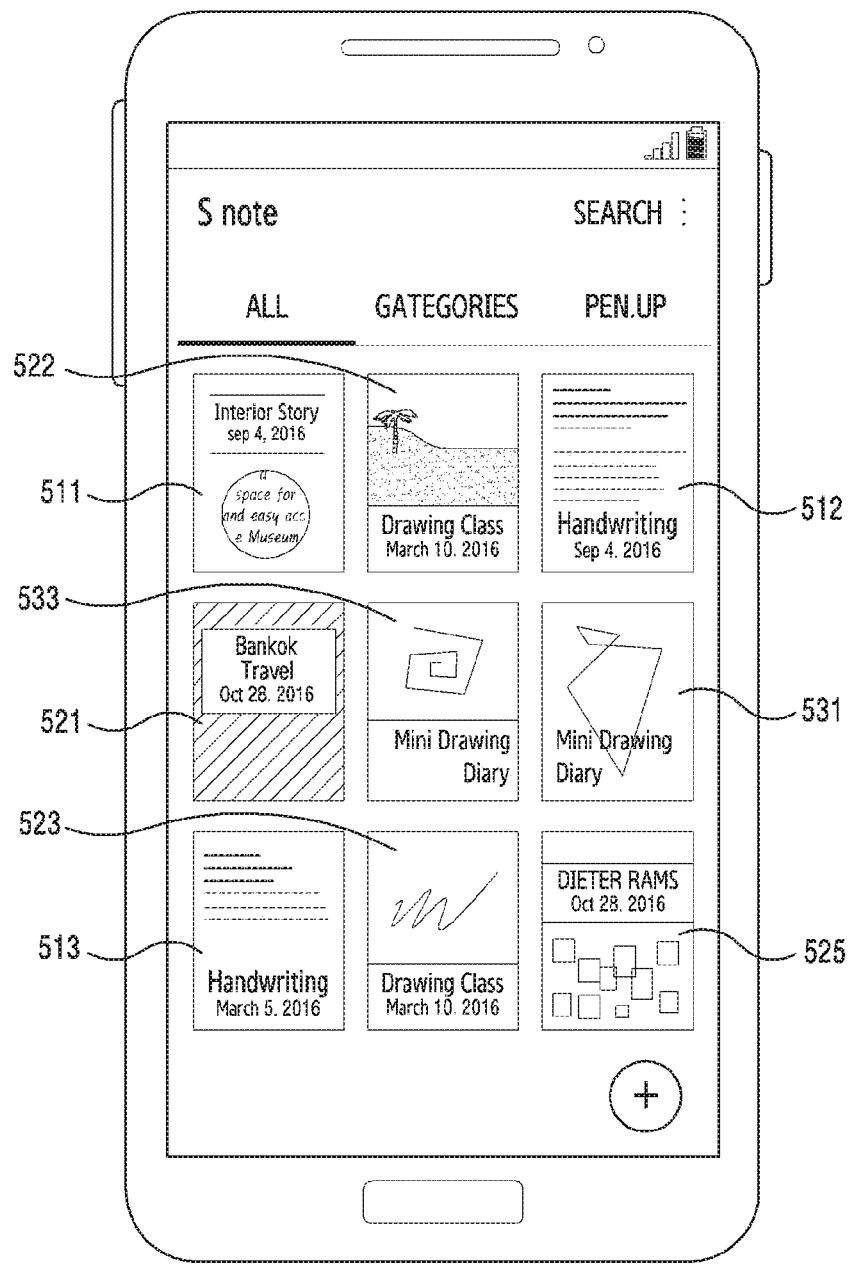

FIG. 5 is a view illustrating an example of a screen of a list of notes in the electronic device according to various embodiments of the present disclosure.

As shown in FIG. 5, FIG. 5 illustrates an example of a screen displaying a list of note files generated in the electronic device 100. Referring to FIG. 5, each of note files may intuitively inform the user of what note a corresponding note file is about through a cover image.

According to various embodiments, a cover image of a note file may be generated based on an object of a created note. Accordingly, the respective note files may be expressed by different cover images according to objects of the notes created by the user. For example, when the object is a text, contents of the texts displayed on the cover images (or forming the cover images) may be different. In addition, when the object is a content (for example, an image (a photo, an icon, etc.), a video, music, etc.), images (for example, photos, captured portions of video, album covers of music) displayed on the cover images (or forming the cover images) may be different.

According to various embodiments, in the example of FIG. 5, the note files 511, 512, 513 may be examples of cover images based on text objects (for example, handwriting input). The note files 511, 512, 513 may be provided with different cover images combining text objects and file information (for example, a name, date). According to various embodiments, the note file 511 and the note files 512, 513 may be implemented by different templates (for example, the first type (for example, the note file 511), and the second file (for example, the note files 512, 513)).

According to various embodiments, in the example of FIG. 5, the note files 521, 522, 523, 525 may be examples of cover images based on image objects. The note files 521, 522, 523, 525 may be provided with different cover images combining image objects and file information (for example, a name, a date). According to various embodiments, the note files 521, 525, and the note files 522, 523 may be implemented by different templates (for example, the third type (for example, the note files 521, 525), the fourth type (for example, the note files 522, 523)).

According to various embodiments, cover images may be provided in a standardized form according to a template previously provided in the electronic device 100, in addition to the object of the last page, according to setting of the electronic device 100. For example, the note files 531, 533 may show examples of cover images provided based on an image defined by the electronic device 100, regardless of the object of the created note.

According to various embodiments, a set number of templates may be implemented, and positions, shapes, or effects of the corresponding object and the file information may be applied differently according to a type of a corresponding template (for example, the first type, the second type, the third type, and the fourth type).

According to various embodiments, when the user selects a specific note file in the list of note files displayed as shown in FIG. 5, the electronic device 100 may execute the note file on the page associated with the object which is used for the cover image. According to an embodiment, if the cover image is generated based on at least one object of a specific set page (for example, a last page, a recently modified page, or a page including a main object), the page (for example, a last page, a recently modified page, a page including a main object) including the corresponding object used for the cover image among the pages of the note may be directly opened (or executed) when the note file is opened (or executed). For example, when a specific note file is selected in the list, the electronic device 100 may parse pages of the selected note file, determine a page having a main object from among the parsed pages, and may execute the note on the determined page.

According to various embodiments, when generating a cover image, the electronic device 100 may include information regarding a content included in the note. For example, when a content such as an image, a video, or a music is inserted into the note, the electronic device 100 may display an associated item (for example, an icon form) indicating that the corresponding content is included, and may provide the item to the user. According to an embodiment, when a video is included in the note, the electronic device 100 may generate a cover image including an associated item (for example, an icon form associated with a video (for example, a film icon)) identifying the video. According to an embodiment, when music is included in the note, the electronic device 100 may generate a cover image including an associated item (for example, an icon form associated with music (for example, a musical note icon)) identifying the music.

According to various embodiments, when the cover image includes an associated item, the associated item may be displayed on a certain region of the cover image of the corresponding note file in the list of FIG. 5. Accordingly, the user can intuitively determine that a content such as a video or music is inserted into the corresponding note.

FIGS. 6A, 6B, 6C, and 6D are views illustrating examples of cover images provided in the electronic device according to various embodiments of the present disclosure.

Figure 6A:
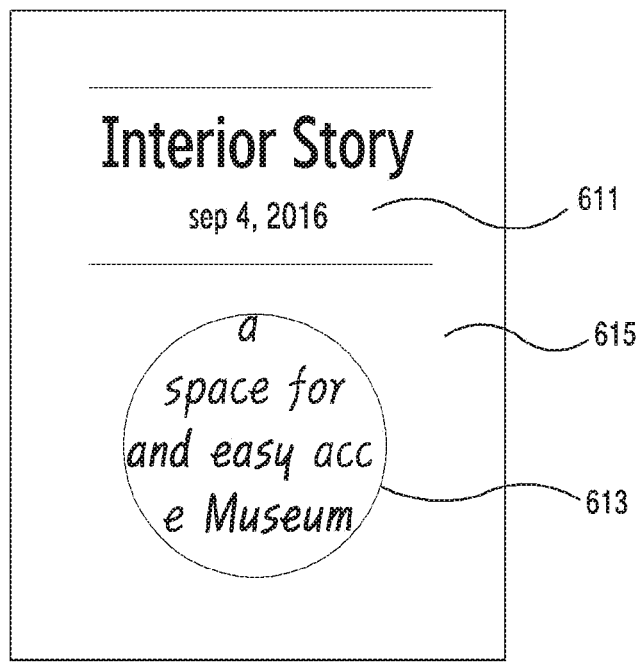
FIGS. 6A, 6B, 6C, and 6D are views illustrating examples of cover images provided in the electronic device according to various embodiments of the present disclosure.

Referring to FIGS. 5 and 6A, as shown in the example of the cover image of the note file 511 of FIG. 5, the first type may display a part or an entirety (for example, a handwritten region, an image) of a corresponding object (for example, a text object, an image object) in a specific figure 613 (for example, a circle, an oval, a star, a rectangle, a triangle), and may apply an opacity value of a specific color to the other background region 615, and add file information 611 (for example, a name (Interior Story), a date (Sep. 4, 2016)) in the background region 615.

Figure 6B:

Referring to FIGS. 5 and 6B, as shown in the examples of the cover images of the note files 512, 513 of FIG. 5, the second type may display an image of a part or entirety of a corresponding object (for example, a text object, an image object) after alignment (for example, text alignment, font type change, font size change), and may apply different opacity values of a specific color to the whole page, and may add file information 623 (for example, a name (Handwriting), a date (Sep. 4, 2016)) to a certain region 621 (for example, a low-transparency area, for example, a lower end region in FIG. 6B).

Figure 6C:
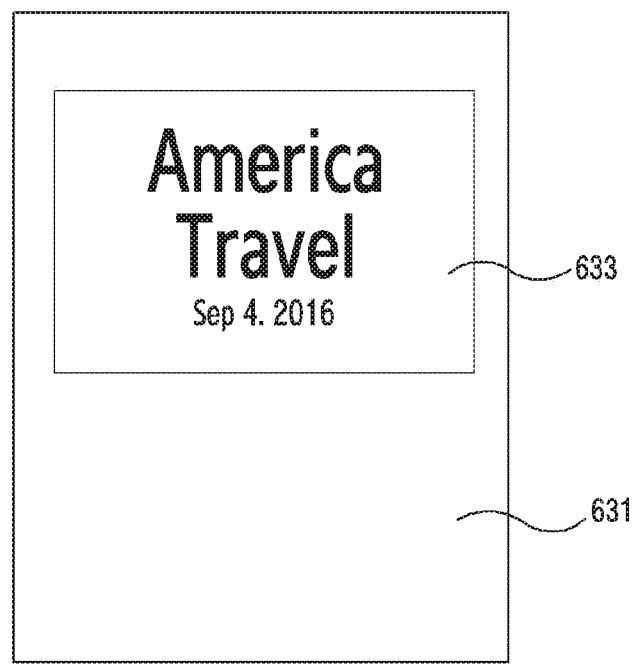

Referring to FIGS. 5 and 6C, as shown in the examples of the note files 521, 525 of FIG. 5, the third type may display an image of a part or entirety of a corresponding object (for example, a text object, an image object) (for example, a background image 631), and may add file information 633 (for example, a name (America Travel), a date (Sep. 4, 2016)) in a certain region of the background image 631. According to various embodiments, the file information 633 may not be inlaid into the background image 631 as shown in the example of FIG. 6B, and may be generated as an image of a specific figure (for example, a circle, a rectangle, an oval) and may be combined with the background image 631.

Figure 6D:
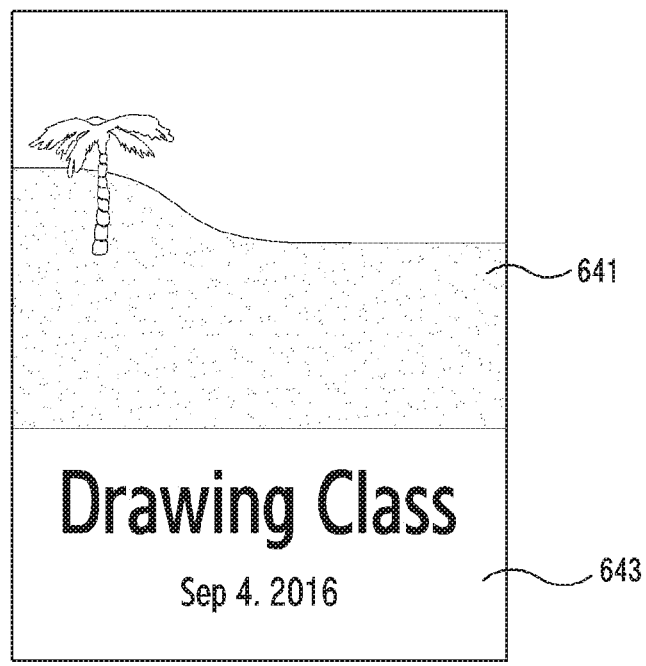

Referring to FIG. 5 and FIG. 6D, as shown in the examples of the cover images of the note files 522, 523 of FIG. 5, the fourth type may display an image of a part or an entirety of a corresponding object (for example, a text object, an image object) which is imaged to have a size corresponding to a first setting region 641 (for example, an image region) of a template, and may add file information (for example, a name (Drawing Class), a date (Sep. 4, 2016)) to a second setting region 643 (for example, a file region) of the template. For example, the fourth type may be divided into two regions, the first setting region 641 and the second setting region 643, and may separately display an image corresponding to the object and an image corresponding to the file information.

Hereinafter, an example of an operation of processing an object (for example, a text object, an image object) to be converted into visual information for a cover image as described above with reference to FIGS. 4 to 6D will be described. For example, in various embodiments, a page finally created by the user may be extracted, and an object of the extracted page may be processed (for example, image processing) into a cover image.

FIGS. 7A to 7D and FIGS. 8 to 11 are views illustrating various operations of converting an object into visual information in the electronic device according to various embodiments of the present disclosure.

Figure 7A:
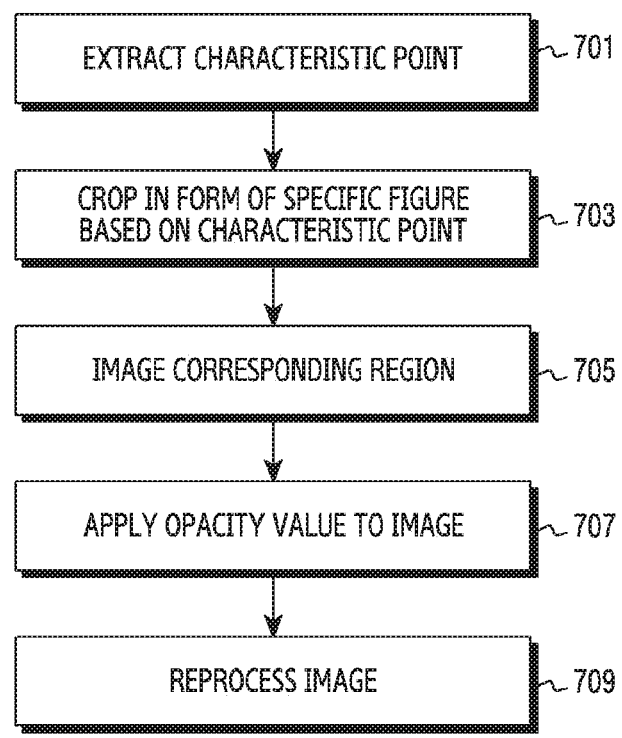

As shown in FIG. 7A, FIG. 7A illustrate an example of converting an object of a note (for example, a text object, an image object) into visual information of a cover for a cover image, based on a characteristic point of the object.

Figure 8:
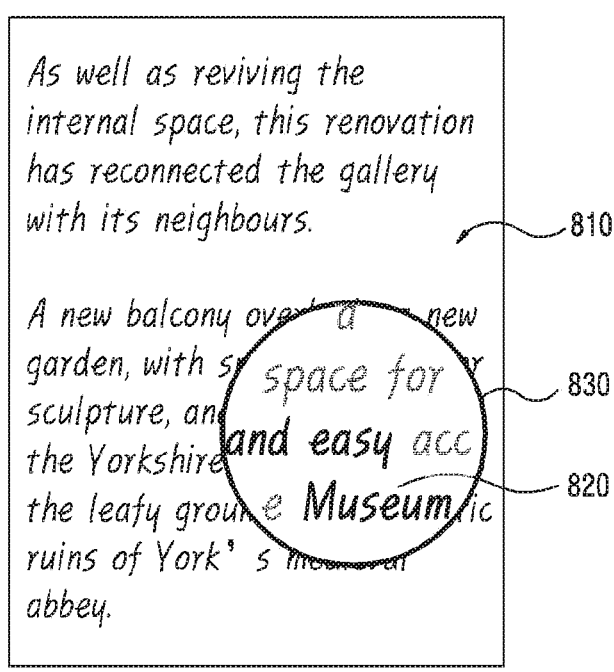
Figure 10:
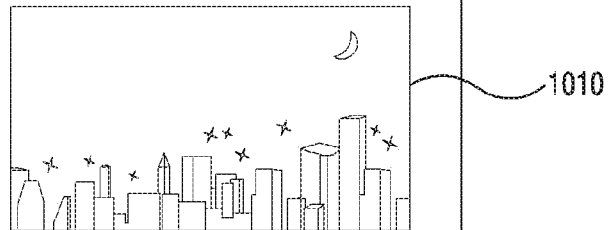
Figure 11:
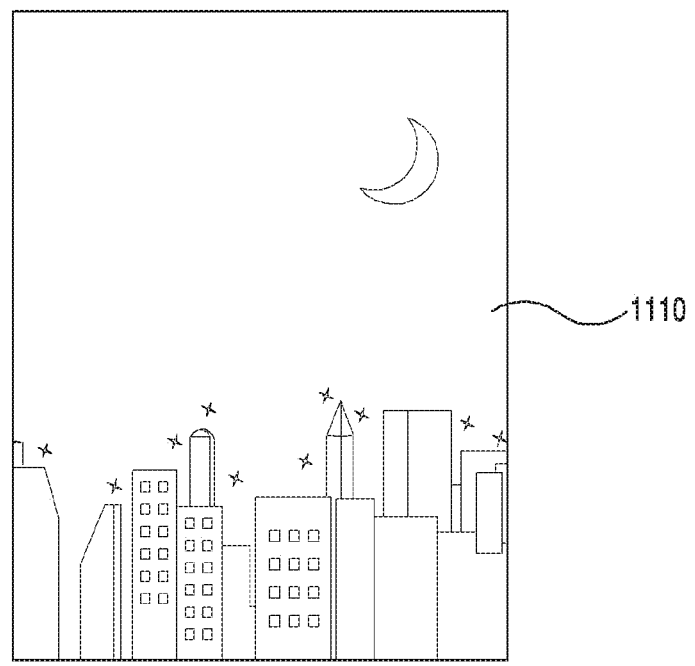

Referring to FIG. 7A, the electronic device 100 may extract a characteristic point based on an object of a last page (operation 701). For example, referring to FIG. 8, FIG. 8 illustrates an example of a screen which displays a page formed of a text object 810 created by handwriting. The electronic device 100 may extract a characteristic point (for example, a portion having a distinct feature from surrounding areas, such as a font color, a font style (for example, bold, italics, etc.), a highlighted portion, a picture (figure) drawn by handwriting) from the text object 810. According to various embodiments, when a plurality of characteristic points are extracted, the electronic device may extract a corresponding characteristic point according to priority (for example, a font type), or may extract all characteristic points in a single range (for example, a range of a rectangle). According to an embodiment, the electronic device 100 may extract an object region 820 (for example, a portion written in bold) having a distinct feature from surrounding objects (or determined to be important) as a characteristic point.

The electronic device 100 may crop the object in the form of a specific figure (for example, a circle, an oval, a rectangle, a triangle, a star shape) based on the extracted characteristic point (operation 703). For example, referring to FIG. 8, the electronic device 100 may crop the text object in the form of a circle 830 having a specific range (which is pre-set or can be reset by the user) based at least in part on the object region 820 extracted as the characteristic point.

The electronic device 100 may perform image-processing (for example, changing to an image of a size corresponding to a page) based on the object of the circle 830 cropped (circular image) (operation 705).

The electronic device 100 may apply an opacity value (for example, opacity of 10%, 15%) to the text-based object (circular image) of the circle 830 in a specific color (operation 709), and may reprocess the object into an image (operation 709). An example of a result of these operations is illustrated in FIG. 6A.

Figure 7B:
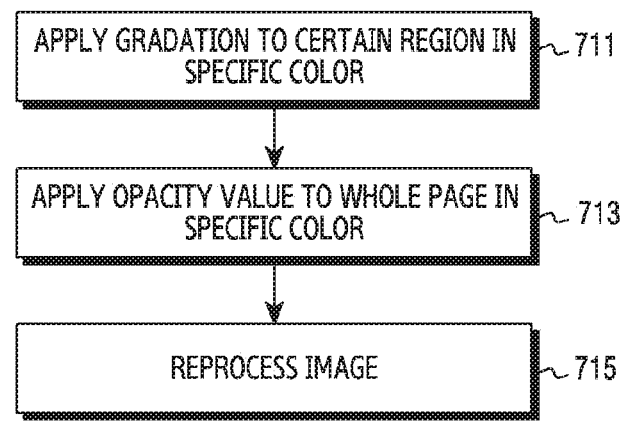

Referring to FIG. 7B, the electronic device 100 may image based on an object of a last page, and may apply a gradation of a specific color to a part of the image (operation 711). For example, referring to FIG. 9, the electronic device 100 may apply a gradation to a lower end 910 of the page in a specific color, thereby providing an effect of hiding a portion of the object (for example, a text object, an image object) of the page.

The electronic device 100 may apply an opacity value to the whole page in a specific color (for example, an opacity of 10%, 15%) (operation 713), and may reprocess the object into an image (operation 715). According to various embodiments, the electronic device 100 may align a text object (for example, text paragraph alignment, a paragraph shape, indentation), and then may reprocess the object. According to various embodiments, the electronic device 100 may align an image object (for example, center alignment), and then may reprocess the object. An example of a result of these operations is illustrated in FIG. 6B.

Figure 7C:
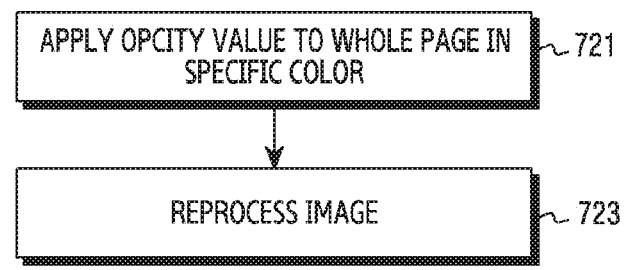

Referring to FIG. 7C, the electronic device 100 may apply an opacity value to the entirety of a last page in a specific color, and generate the corresponding page as an image (operation 721), and may reprocess the corresponding image by resizing (operation 723). According to an embodiment, on the assumption that the object is an image object and a cover is generated based on the image object, the electronic device 100 may apply an opacity value to the image object in a specific color, and may reprocess the image object by resizing. An example of a result of these operations is illustrated in FIG. 6C.

Figure 7D:
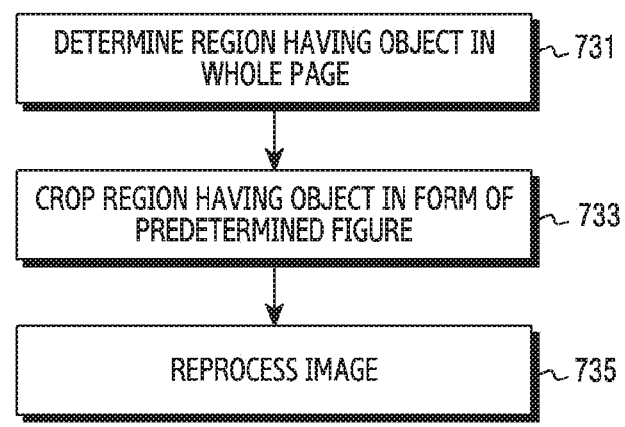

Referring to FIG. 7D, the electronic device 100 may determine a region having an object in the whole page (operation 731), and may crop the region having the object in the form of a corresponding figure to be included in the figure (operation 733). The electronic device 100 may reprocess the object into an image based on the object cropped in the form of a figure (operation 735). For example, referring to FIG. 10, the electronic device 100 may reprocess a portion (for example, an image object 1010) of the objects in a page in which an image object and a text object are mixed into an image of a certain region of a cover (for example, the first setting region 641). In another example, referring to FIG. 11, when an image object 1110 occupies a whole page or the page by a predetermined ratio or more, the electronic device 100 may crop a portion of the image object 1110 in the form of a specific figure, and may reprocess the portion into an image of a certain region of a cover. In another example, the electronic device 100 may crop a portion having a text object in a page in the form of a predetermined figure, and may reprocess the portion into an image of a certain region of a cover. An example of a result of these operations is illustrated in FIG. 6D described above.

According to various embodiments, preview covers may be generated through the reprocessing operations shown in FIGS. 7A to 7D, and a cover image may be generated based on a preview cover selected by the user from the generated preview covers, and file information according to a user input.

According to various embodiments, when a text object and an image object are mixed, the electronic device 100 may generate a portion (for example, the first type, the second type) of the preview covers based on the text object, and may generate the other portion (for example, the third type, the fourth type) of the preview covers based on the image object according to the operations of FIGS. 7A to 7D described above, and may generate preview covers based on various combinations.

Figure 12:
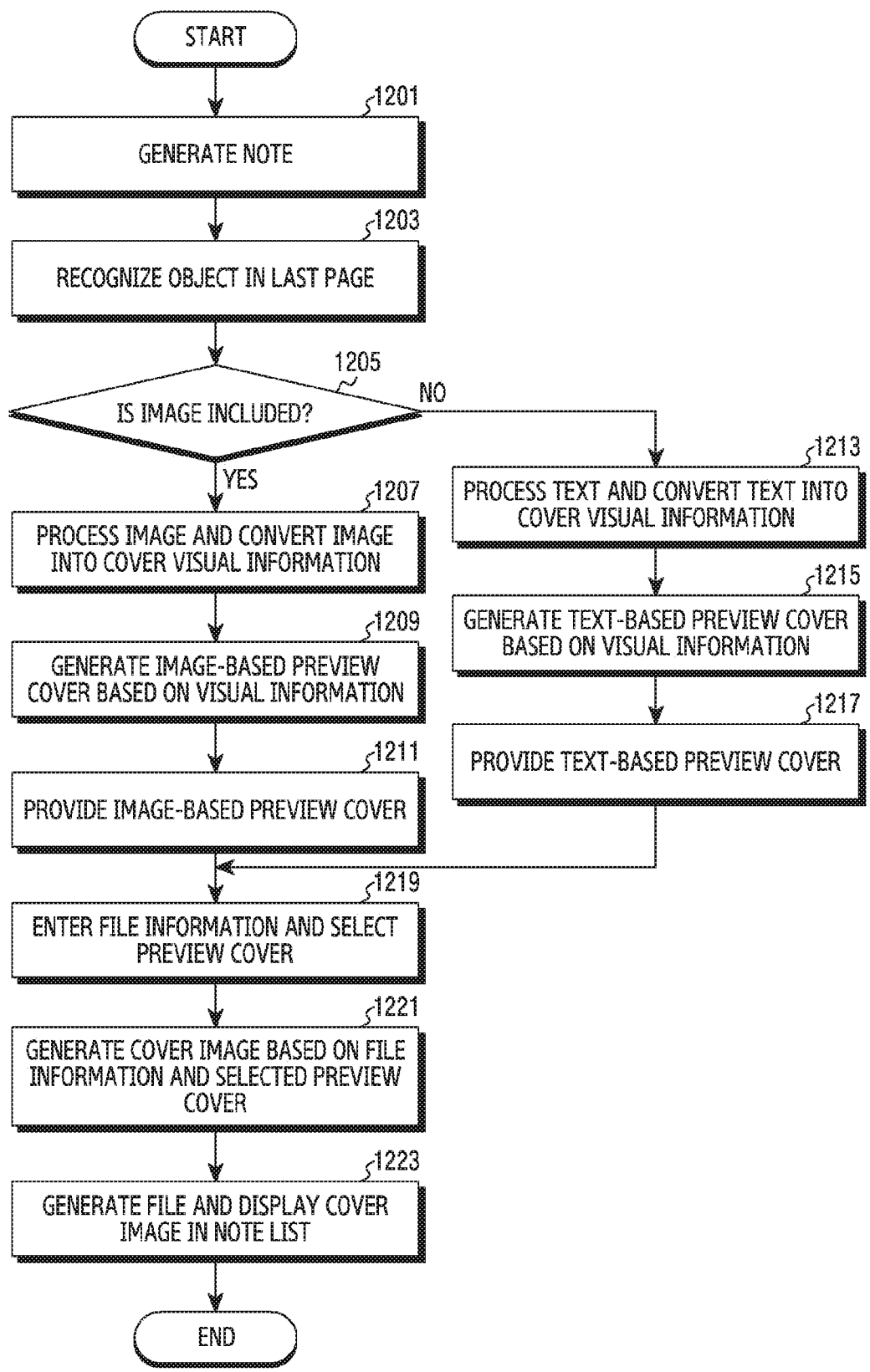
FIG. 12 is a flowchart illustrating a method for providing a note cover in the electronic device according to various embodiments of the present disclosure.

FIG. 12 is a flowchart illustrating a method for providing a note cover in the electronic device according to various embodiments of the present disclosure.

Referring to FIG. 12, in operation 1201, the controller 180 (for example, a processor) of the electronic device 100 may detect a note generated. For example, the controller 180 may create a note in response to a user input (for example, inputting by handwriting, inserting an image, etc.), and may detect a user input for saving the created note (for example, a saving request input).

In operation 1203, the controller 180 may recognize an object based on a last page of the created note. For example, the controller 180 may determine the last page of the created note in response to the note generation being detected, and may analyze an object (for example, a text object, an image object) in the determined page. According to various embodiments, the electronic device 100 may determine a page recently modified by the user among the pages of the note, rather than the last page of the note, and may perform the cover image generation operation by recognizing an object of the corresponding page. According to various embodiments, the electronic device 100 may determine a page having a main object among the pages of the note, rather than the last page of the note, and may perform the cover image generation operation by recognizing an object of the corresponding page.

In operation 1205, the controller 180 may determine whether the object of the corresponding page includes an image. For example, the controller 180 may determine whether there is an image object in the recognized objects, based on a result of recognizing the object.

When it is determined that an image is included in the page in operation 1205 (Yes in operation 1205), the controller 180 may process the image and convert the same into cover visual information in operation 1207. According to an embodiment, the controller 180 may perform image processing having a different effect (for example, a specific figure shape, color application, opacity adjustment) according to a pre-defined template (or layout), based on the image. That is, the controller 180 may process the image created by the user into an image for a cover image.

In operation 1209, the controller 180 may generate an image-based preview cover based on visual information. According to various embodiments, the controller 180 may generate one or more preview covers according to a pre-defined template. The preview cover may indicate a preview image of a cover image to be generated.

In operation 1211, the controller 180 may provide the image-based preview cover. For example, the controller 180 may provide one or more preview covers through a certain region of the note saving pop-up 400 (for example, the cover region 430) as shown in the example of FIG. 4 described above.

When it is determined that the page does not include an image in operation 1205 (No in operation 1205), the controller 180 may process a text and convert the text into cover visual information in operation 1213. According to an embodiment, the controller 180 may perform image processing having a different effect (for example, a specific figure shape, color application, opacity adjustment) according to a pre-defined template, based on the text. That is, the controller 180 may reprocess the text created by the user into an image for a cover image.

In operation 1215, the controller 180 may generate a text-based preview cover based on the visual information. According to various embodiments, the controller 180 may generate one or more preview covers according to a pre-defined template.

In operation 1217, the controller 180 may provide the text-based preview cover. For example, the controller 180 may provide one or more preview covers through a certain region of the note saving pop-up 400 (for example, the cover region 430) as shown in the example of FIG. 4 described above.

In operation 1219, the controller 180 may detect file information inputted and a preview cover selected. According to an embodiment, the user may enter a file name through the name input field 410 on the note saving pop-up 400, or may use an automatically entered (generated) name (for example, Note 1). According to an embodiment, the user may set a category of the created note through the category selection field 420. The user may select a preview cover for a cover of the note file to be generated from among the preview covers 431, 432, 433, 434 after or before entering the file information. The user may select file information and the preview cover, and then may save the note by selecting the confirmation button 442 (for example, DONE, SAVE, or OK). When the controller 180 detects the confirmation button 442 selected by the user through the note saving pop-up 400, the controller 180 may determine a command to generate (save) the note.

In operation 1221, the controller 180 may generate a cover image based on the file information and the selected preview cover. According to an embodiment, the controller 180 may add time information to the file information (for example, a file name, a category) when generating the note. For example, time information (for example, a date, a time) of a point of time when the corresponding note is saved (generated) may be included in the file information including name information and category information (the category information may not be included) set by the user. The controller 180 may generate a cover image based on the preview cover selected by the user and the file information (for example, a file name, a category, time information) when generating the note. According to an embodiment, the controller 180 may generate the cover image by combining the file information in a certain region (a region set for file information according to a format of a corresponding template) of the preview cover selected by the user.

In operation 1223, the controller 180 may generate a file and may display the cover image on a note list. According to an embodiment, the controller 180 may generate the note file in association with the cover image, and may save the note file in the memory 150, and may provide the cover image of the corresponding note file to the user through the note list. An example thereof is illustrated in FIG. 5.

In the example of FIG. 12, an object in a set page may be recognized and a cover may be generated according to whether an image is included in the object. However, the present disclosure is not limited thereto. For example, an object may be recognized as described above, and it may be determined whether the note includes a content. When the content is included, a type of the content may be identified and a cover may be provided according to an associated operation. According to an embodiment, when the note object is a video, the controller 180 may capture at least portion of the video and may generate a cover based at least in part on the captured image. According to an embodiment, when the note object is music, the electronic device 100 may extract an album cover of the music, and may generate a cover based at least in part on the album cover.

Figure 13:
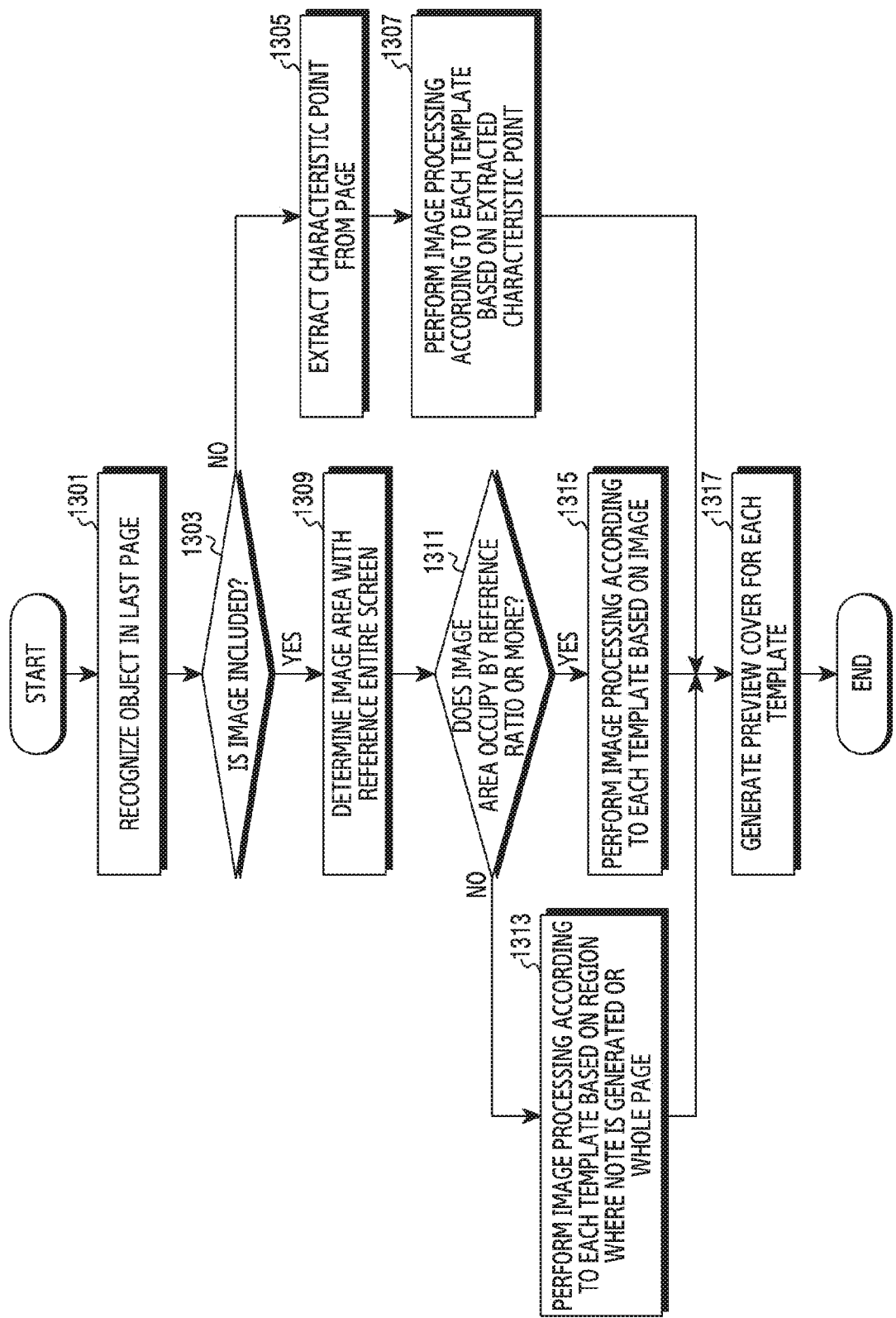
FIG. 13 is a flowchart illustrating a method for generating a preview cover for a note cover in the electronic device according to various embodiments of the present disclosure.

FIG. 13 is a flowchart illustrating a method for generating a preview cover for a note cover in the electronic device according to various embodiments of the present disclosure.

Referring to FIG. 13, in operation 1301, the controller 180 (for example, a processor) of the electronic device 100 may recognize an object based on a last page of a created note. For example, the controller 180 may extract the last page from the created note in response to the note being generated, and may analyze an object (for example, a text object, an image object) in the extracted page. According to various embodiments, the electronic device 100 may extract a page recently modified by the user, rather than the last page of the note, and may perform the cover image generation operation by recognizing an object of the corresponding page. According to various embodiments, the electronic device 100 may extract a page having a main object among the pages of the note, rather than the last page of the note, and may perform the cover image generation operation by recognizing an object of the corresponding page.

In operation 1303, the controller 180 may determine whether the object of the corresponding page includes an image. For example, the controller 180 may determine whether there is an image object among the recognized objects, based on a result of recognizing the object.

When it is determined that the page does not include an image in operation 1303 (No in operation 1303), the controller 180 may extract a characteristic point based on the object (for example, a text object) of the page. According to an embodiment, the controller 180 may extract a specific characteristic point, for example, a portion having a distinct feature from surrounding areas, such as a font color, a font style (for example, bold, italics), a highlighted portion, a picture (figure) drawn by handwriting, from the objects of the region created by the user on the page. For example, the controller 180 may extract, as the characteristic point, a portion determined to be important, such as a text written in red color, a highlighted text (for example, a underlined text, an emphasized text), a figure drawn by handwriting, from the objects of the region created by the user.

In operation 1307, the controller 180 may perform image processing according to a template (layout) based on the extracted characteristic point. For example, the controller 180 may change the extracted characteristic point to an image based at least in part on the object corresponding to the extracted characteristic point or a region thereof. According to various embodiments, the controller 180 may generate one or more images according to a pre-defined template when changing to the image. According to an embodiment, the controller 180 may automatically edit and generate an image in a form corresponding to a specific template (layout).

When it is determined that the page includes an image in operation 1303 (Yes in operation 1303), the controller 180 may determine an area of the image with reference to the entire screen in operation 1309.

In operation 1311, the controller 180 may determine whether the area of the image occupies by a reference ratio or more. For example, the controller 180 may determine whether the area of the image included in the corresponding page occupies N % or more of the entire screen (N is a natural number, for example, 30%). According to various embodiments, the controller 180 may recommend or may not recommend an image-based cover according to what percentage (%) of the screen of the electronic device 100 is occupied by the area of the image included in the page.

When it is determined that the area of the image is less than a reference ratio in operation 1311 (No in operation 1311), the controller 180 may perform image processing according to a template (layout) based on a region where the note is created or the whole page. For example, the controller 180 may change to an image based on at least part of the region including the object in the page (for example, a text region, an image region, or a mixture region of a text and an image). According to various embodiments, the controller 180 may generate one or more images according to a pre-defined template when changing to the image. According to an embodiment, the controller 180 may automatically edit and generate an image in a form corresponding to a specific template (layout).

When it is determined that the area of the image is greater than or equal to the reference ratio in operation 1311 (Yes in operation 1311), the controller 170 may perform image processing according to a template (layout) based on the image. For example, the controller 180 may change the object to an image for a cover, based on at least part of the image in the page. According to various embodiments, the controller 180 may generate one or more images according to a pre-defined template when changing to the image. According to an embodiment, the controller 180 may automatically edit and generate an image in a form corresponding to a specific template (layout).

In operation 1317, the controller 180 may generate a preview cover for each template (layout). For example, the controller 180 may generate one or more preview covers corresponding to a template based on the image generated by the image processing in operation 1307, 1313, or 1315. According to various embodiments, the controller 180 may change the object to an image based at least in part on the object created by the user, and may provide the changed image as a preview cover to recommend a cover image. According to various embodiments, the controller 180 may recommend cover images of various forms corresponding to a specific template (layout) based on the preview covers.

Figure 14:
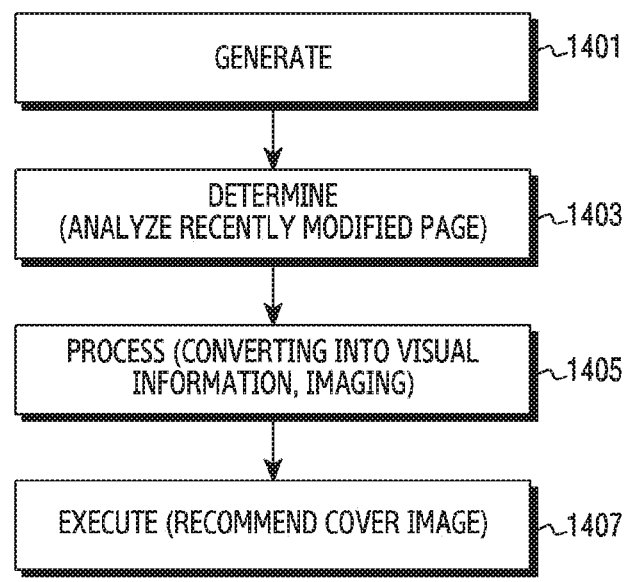
FIG. 14 is a view illustrating an operation of providing a note cover in the electronic device according to various embodiments of the present disclosure.

FIG. 14 is a view illustrating an operation of providing a note cover in the electronic device according to various embodiments.

Referring to FIG. 14, the operation of providing a cover image based on a note object created by the user according to various embodiments may include a generation process 1401, a determination process 1403, a processing process 1405, and an executing process 1407.

According to various embodiments, the generation process 1401 may include an operation of generating a note object based on a user input.

According to various embodiments, the determination process 1403 may include operations of extracting a set page (for example, a last page, a recently modified page, a page including a main object) from the note created by the user, and analyzing (or recognizing) a note object (for example, a text object, an image object) in the extracted page. According to various embodiments, the determination process 1403 may include operations of determining whether there is an image in the extracted page, determining a percentage of an image area occupying the page in the presence of an image, and analyzing and determining a characteristic point of the text object.

According to various embodiments, the processing process 1405 may include an operation of converting the analyzed object into visual information for a cover image, based on the analyzed object. According to an embodiment, the processing process 1405 may configure the object in a specific figure based on the object or at least part of the object region, and may image the object having the specific figure shape, and may apply an opacity value to the object in a certain color. According to an embodiment, a lower end of a region including the object may be hidden by applying a gradation in a specific color, and imaging may be performed by applying an opacity value to the whole page in a specific color. According to an embodiment, a portion including an image in the whole page may be configured in a predetermined figure and may be imaged. According to an embodiment, the whole image may be imaged by downsizing by applying an opacity value to the whole page in a specific color.

According to various embodiments, the executing process 1407 may include an operation of recommending a note cover (recommending through a preview cover) based on the converted visual information. According to an embodiment, when a note cover is recommended, an image may be automatically edited in a form corresponding to a specific template (layout), and may be provided to the user. According to an embodiment, when a note cover is recommended, a specific region of a portion created by the user may be changed to an image and the image may be provided to the user As described above, the electronic device 100 according to various embodiments may include: extracting a set page in response to a note being generated; recognizing at least one object in the extracted page; generating visual information for a cover image based on the object; displaying a preview cover based on the visual information; and generating a cover image based on the preview cover and file information associated with the note.

According to various embodiments, extracting the page may include extracting a last page of the note, a recently modified page of pages of the note, or a page including a main object.

According to various embodiments, generating the visual information may include: determining an image object in response to the object being recognized; generating the visual information based on a text object when the image object does not exist in the page; and generating the visual information based on the image object when the image object exists in the page.

According to various embodiments, generating the visual information based on the text object may include: extracting a characteristic point in the text object; generating the visual information based on an object corresponding to the characteristic point.

According to various embodiments, extracting the characteristic point may include extracting, from the text object, the characteristic point based on at least part of a font color different from those of surrounding objects, a font style, a highlighted portion, and a picture drawn by handwriting.

According to various embodiments, extracting the characteristic point may include, when a plurality of characteristic points are extracted from the text object, determining a characteristic point according to a set priority, or determining a characteristic point by including all of the characteristic points in a single range.

According to various embodiments, generating the visual information based on the image object may include: determining an image area of the image object with reference to an entire screen; when the image area is less than a reference ratio, generating the visual information based on at least part of a region including an object in the page; and, when the image area is greater than or equal to the reference ratio, generating the visual information based on at least part of the image object.

According to various embodiments, generating the visual information may include generating one or more pieces of visual information corresponding to a pre-defined template, by using the object.

According to various embodiments, the method may further include generating the cover image by combining a preview cover selected from the preview covers and file information related to the note, and the file information may include a file name and time information.

According to various embodiments, displaying the preview cover may include providing a recommendation marker on a specific preview cover recommended by the electronic device among the preview covers.

While specific embodiments have been described in the detailed descriptions of the present disclosure, various changes can be made within a limit without departing from the scope of the present disclosure. Therefore, the scope of the present disclosure should not be limited to and defined by the above-described exemplary embodiments, and should be defined not only by the appended claims but also by the equivalents to the scopes of the claims.

What is claimed is:

1. An electronic device comprising:
    a display;
    a memory; and
    a processor electrically connected with the display and the memory,
    wherein the processor is configured to:
        create a note in response to a user input related to note creation;
        extract a set page in response to detection of completion of the note creation;
        recognize at least one object in the extracted page, wherein the at least one object comprises a text object and an image object;
        generate visual information based on the image object when the image object exists in the extracted page;
        generate visual information based on the text object when the image object does not exist in the extracted page;
        display at least one preview cover based on the visual information;
        receive an input for selecting one preview cover among the at least one preview cover;
        generate a cover image of a note file by combining the selected preview cover and file information associated with the note; and
        store the note as the note file using the cover image and display a note list including the cover image of the note file.

2. The electronic device of claim 1, wherein the processor is configured to extract a last page of the note, a most recently modified page of pages of the note, or a page comprising a main object, and
    wherein the main object indicates an object of a specific form expressing or distinguishing a feature of the note.

3. The electronic device of claim 1, wherein the processor is configured to extract a characteristic point in the text object, and to generate the visual information based on an object corresponding to the characteristic point.

4. The electronic device of claim 3, wherein the processor is configured to extract, from the text object, the characteristic point based on at least part of a font color different from those of surrounding objects, a font style, a highlighted portion, and a picture drawn by handwriting.

5. The electronic device of claim 1, wherein the processor is configured to:
    determine an image area of the image object with reference to an entire screen, when the image area is less than a reference ratio, generate the visual information based on at least part of a region comprising an object in the page; and
    when the image area is greater than or equal to the reference ratio, generate the visual information based on at least part of the image object.

6. The electronic device of claim 1, wherein the processor is configured to generate one or more pieces of visual information corresponding to a pre-defined template, by using the object.

7. The electronic device of claim 1, wherein the file information comprises a file name and time information.

8. The electronic device of claim 1, wherein the processor is configured to provide a recommendation marker on a specific preview cover recommended by the electronic device among the at least one preview cover.

9. The electronic device of claim 4, wherein the processor is configured to, in response to identifying that a plurality of characteristic points are extracted from the text object, determine a characteristic point according to a set priority, or determine a characteristic point by including all of the characteristic points in a single range.

10. An operating method of an electronic device, the method comprising:
    creating a note in response to a user input related to note creation;
    extracting a set page in response to detection of completion of the note creation;
    recognizing at least one object in the extracted page, wherein the at least one object comprises a text object and an image object;
    generating visual information based on the image object when the image object exists in the extracted page;
    generating visual information based on the text object when the image object does not exist in the extracted page;
    displaying at least one preview cover based on the visual information;
    receiving an input for selecting one preview cover among the at least one preview cover;
    generating a cover image of a note file by combining the selected preview cover and file information associated with the note; and
    storing the note as the note file using the cover image and displaying a note list including the cover image of the note file.

11. The method of claim 10, wherein extracting the page comprises extracting a last page of the note, a most recently modified page of pages of the note, or a page comprising a main object, and wherein the main object indicates an object of a specific form expressing or distinguishing a feature of the note.

12. The method of claim 10, wherein generating the visual information based on the text object comprises:
    extracting a characteristic point in the text object;
    generating the visual information based on an object corresponding to the characteristic point.

13. The method of claim 10, wherein generating the visual information based on the image object comprises:
    determining an image area of the image object with reference to an entire screen;
    when the image area is less than a reference ratio, generating the visual information based on at least part of a region comprising an object in the page; and
    when the image area is greater than or equal to the reference ratio, generating the visual information based on at least part of the image object.

14. The method of claim 10, wherein displaying the at least one preview cover comprises providing a recommendation marker on a specific preview cover recommended by the electronic device among the at least one preview cover.

15. The method of claim 12, wherein the extracting the characteristic point comprises extracting, from the text object, the characteristic point based on at least part of a font color different from those of surrounding objects, a font style, a highlighted portion, and a picture drawn by handwriting.

16. The method of claim 12, wherein the extracting the characteristic point comprises, in response to identifying that a plurality of characteristic points are extracted from the text object, determining a characteristic point according to a set priority, or determining a characteristic point by including all of the characteristic points in a single range.

17. The method of claim 11, wherein the generating the visual information comprises generating, by using the object, one or more visual information corresponding to preset template.

* * * * *